United States Patent [19]

Dombrowski et al.

[11] Patent Number: 4,667,546
[45] Date of Patent: May 26, 1987

[54] METHOD FOR ACHIEVING CHIP SEPARATION WHILE MACHINING WORK PIECES

[75] Inventors: Theodor Dombrowski, Erkelenz; Hartwig Klosterhalfen, Duren, both of Fed. Rep. of Germany

[73] Assignee: Wilhelm Hegenscheidt Gesellschaft mbH, Erkelenz, Fed. Rep. of Germany

[21] Appl. No.: 842,812

[22] Filed: Mar. 21, 1986

[30] Foreign Application Priority Data

Apr. 9, 1985 [EP] European Pat. Off. ........ 85104285.3

[51] Int. Cl.$^4$ ............................ B23B 1/00; B23B 5/28
[52] U.S. Cl. ........................................ 82/1 C; 82/8; 82/21 A; 82/24 R; 82/DIG. 9
[58] Field of Search ................ 82/1 C, 8, 21 A, 24 R, 82/DIG. 9

[56] References Cited

U.S. PATENT DOCUMENTS

| 3,174,404 | 3/1965 | Findley | 82/25 |
| 3,473,435 | 10/1969 | Tse et al. | 82/DIG. 9 |
| 3,754,487 | 8/1973 | Nachtigal | 82/DIG. 9 |

FOREIGN PATENT DOCUMENTS

| 2233229 | 1/1973 | Fed. Rep. of Germany . | |
| 16301 | 1/1985 | Japan | 82/DIG. 9 |
| 323191 | 2/1972 | U.S.S.R. | 82/DIG. 9 |
| 761151 | 9/1980 | U.S.S.R. | 82/1 C |

OTHER PUBLICATIONS

"Intermittent Cutting with an Oscillating Tool", pp. 3-8, by Merrells and Thompson—Cutting Tool Engineering, Jan. 1975.

Primary Examiner—Nicholas P. Godici
Assistant Examiner—Jerry Kearns
Attorney, Agent, or Firm—W. G. Fasse; D. H. Kane, Jr.

[57] ABSTRACT

Chip separation is assured while turning work pieces, by causing an oscillating movement of the turning or lathe tool during the work piece rotation. The tool oscillation is controlled in response to the work piece rotation and so that the tool oscillates periodically along or rather relative to a line defined by the feed advance vectors of the tool movement. The oscillation amplitude corresponds approximately to half the effective feed advance path for each work piece revolution. The wave length of the oscillation has a magnitude such that it itself or an integral multiple thereof, plus a half wave length, is equal to the momentary respective work piece circumference at the instantaneous point of contact between the tool and the work piece. Several ways are possible for imparting an oscillating movement to the tool support or tool supports.

2 Claims, 24 Drawing Figures

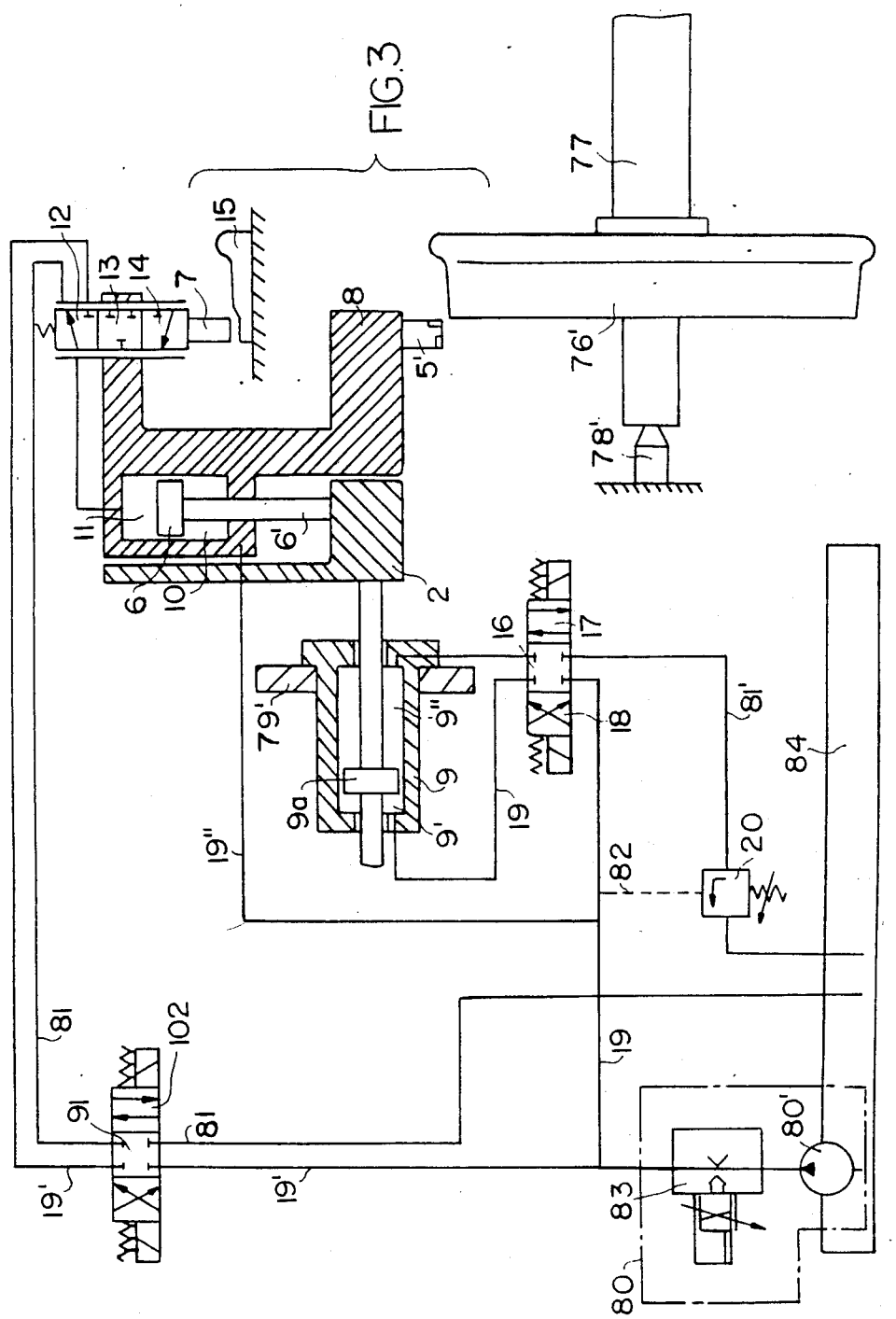

METHOD FOR ACHIEVING CHIP SEPARATION WHILE MACHINING WORK PIECES

FIELD OF THE INVENTION

The invention relates to a method for achieving chip separation or positive chip breaking while turning or otherwise machining work pieces, by means of varying the feed of the turning tool or lathe tool during the course of work piece rotation. The invention further relates to an apparatus for carrying out the method of the invention.

DESCRIPTION OF THE PRIOR ART

Such a method and a corresponding apparatus are known in German Patent Publication (DE-OS) 2,233,229. However, it has been shown that this method does not assure a reliable separation or breaking of chips or shavings. Rather, during the turning or lathe machining of a work piece, this method causes a periodic alternation between short separating chips, and then for longer stretches of time chips are produced which do not separate with a short length, and which have varying chip thicknesses. Furthermore, the known method may only be used for a linear machining of a work piece, and the known apparatus does not allow any other tool movement, except a linear tool movement.

OBJECTS OF THE INVENTION

In view of the foregoing it is the aim of the invention to achieve the following objects singly or in combination:

- to provide a method for reliably producing short chips, that is, chips which break consistently for proper chip separation when turning or machining work pieces, especially for the turning or lathe machining of work pieces having a very large diameter, for example when truing railroad wheels;
- to achieve a uniform chip size and thickness in such a manner, that the length of the separated chip pieces may be predetermined;
- to allow the use of such a method even for work pieces with nonlinear contours;
- to provide an apparatus for carrying out such a method and its improvements; and
- to allow such an apparatus to be used for many modes of machining, and for various adjustable tool movements.

SUMMARY OF THE INVENTION

These objects have been achieved, by the method of the invention, in that the tool is caused to oscillate relative to the line of feed advance or along the direction of the feed vectors while the amplitude of this oscillation corresponds approximately to one half of the effective feed distance per work piece revolution and the wave length of the oscillation corresponds, either itself or an integral multiple of the wave length, to the respective instantaneous work piece circumference plus one half wave length at the current work point or point of contact between tool and work piece.

Thus, it is noted that the known oscillatory movement of the turning or lathe tool no longer must lie on a straight line, or rather, in a straight plane In fact, according to the invention, the tool shall follow with its oscillation the feed advance vectors, so that the oscillatory movement can also be achieved along a curved path. Hence, the oscillatory movement is not fundamentally linear, instead the tool shall constantly oscillate along the contour to be produced or machined. For this purpose, it is important that the oscillation amplitude corresponds approximately to one half of the effective feed advance path through which the tool advances per revolution of the work piece. The "effective feed advance path" is the distance through which the tool advances along the contour to be produced. In order to achieve the desired separation or breaking of chips, the wave length of the oscillation of the tool is especially important. This wave length must be of such magnitude that the wave length itself or an integral multiple thereof plus one half a wave length of the oscillation, corresponds to the circumference described by the motion of the current work point of the tool against the work piece, as the work piece makes one revolution. Such a choice of the amplitude and wave length results in a corresponding oscillatory tool movement which assures that the minima and maxima of the work piece contour produced by the tool oscillation, coincide so that a wave trough of a previous cut is followed by a wave peak of the following cut as viewed in the feed advance direction. At this coincidence point, the chip thickness, therefore, becomes at least approximately zero, and the chip separates and breaks off. Accordingly, the chip separation proceeds with absolute reliability and is not dependent upon any chance configuration of the work piece or any other factors. Furthermore, the chip length is now adjustable or selectable by adjusting the wave length of the tool oscillation.

An apparatus for carrying out the method of the invention may, for example, be a turning machine or lathe with a support, having at least one driven lengthwise carriage and one driven crosswise carriage for moving the lathe or turning tool. The drive for these carriages is controlled by a control device. The term "support" used above, is not limited to only those devices wherein the carriage movement is controlled by a template which is traced or copied. The term is intended to also include such devices wherein the movement of the carriage is, for example, controlled numerically according to a given program, whereby in effect, the motion program of the controlling computer is copied, so to speak.

In order to carry out the method of the invention in such an apparatus, means are provided for achieving a periodic oscillatory motion, more specifically an oscillatory tool motion. These means cooperate with the control device so that the achieved oscillatory tool motion takes place at every point all along the contour to be machined. Further, means are provided for adjusting or setting the amplitude and the frequency of the oscillatory tool motion.

Means for achieving a periodic oscillatory motion are known as such in the art, as described in the above mentioned German Patent Publication (DE-OS) 2,233,229. However, it is now additionally provided, that the oscillatory motion is always directed along the contour to be produced and such contour need not be linear. In order to achieve this purpose, it is necessary that the structural elements achieving the oscillatory motion cooperate with the machine control, so that the control is caused to carry out a pendulum motion, or a motion in opposite directions. For this purpose it is simply necessary to apply a reversing control to the elements which cause the tool motion, in a manner appropriate for the type of construction of the control.

Furthermore, it is necessary to determine and adjust the amplitude and frequency of the oscillatory motion. The magnitude of the size of the amplitude is dependent on the feed advance to be transmitted, whereby the oscillation frequency of the tool is to be adjusted so as to achieve the present purpose as described above. In other words, the frequency must be of such a magnitude that an integral multiple of the wave length corresponding to the frequency, plus a half wave length, corresponds to the circumference of the circular motion of a work point on the rotating work piece. The frequency must be adjusted in relation to the rotational speed (r.p.m.) of the work piece, in order to achieve this purpose.

For such frequency adjustment one embodiment of the apparatus according to the invention, comprises means for determining the rotational speed of a main shaft or spindle. Such means are connected or connectable with the means for setting the frequency of the oscillatory motion, so that a change in the rotational speed of the main shaft causes a proportional change of the frequency of the oscillatory tool motion. By these means it is possible to maintain a previously adjusted relation between the frequency and the rotation speed, even while the rotation speed varies, for example, for changing the cutting speed. Thus, a new readjustment of the oscillation frequency is not necessary.

According to the invention it is further provided that the means for achieving the oscillatory motion are positively controlled in response to the rotation speed of the main shaft or spindle, whereby the frequency of the oscillatory motion is adjustable as oscillations per main spindle r.p.m. Without such a positive control, it is possible that minute adjustment errors in the relation between the frequency and rotation speed are compounded or accumulated in the course of many rotations, so that an undesirable phase shift arises in the oscillations of the tool. As a consequence, chip separation may not be achieved for a long time, until later chip separation again is achieved when the phase shift becomes large enough that the initial situation is recreated. The described positive control according to the invention avoids such error accumulation, whereby a high precision adjustment of the relation of the frequency to the rotation speed becomes unnecessary.

Furthermore, a control signal generating device is provided according to the invention for detecting the rotation speed and the rotation angle of the main spindle. This signal generating device supplies control impulses dependent upon the rotation speed and the rotation angle of the main spindle to the means for achieving the oscillatory tool motion. The control impulses arriving during one revolution of the main spindle may be divided or distributed by the signal generating device, so that the means for achieving the oscillatory tool motion carry out (2n+1) half cycles, whereby "n" is a whole number. This is a simple possibility of implementing the positive control, whereby simultaneously in a simple manner the oscillatory motion is superimposed on the necessary feed advance travel.

A further detail of the invention relates to a support controlled by computerized numerical control means (CNC), in which each carriage cooperates with a travel path measuring system each comprising at least a measuring rule and a slider cooperatively arranged for sensing a distance representing a displacement of the tool carrier. Means for producing an alternating relative motion between the measuring rule and the slider are provided, whereby these relative motion producing means are coordinated with one another by at least a frequency generator. Therefore, it is possible also to achieve the desired oscillatory tool motion in a system in which each carriage is CN-controlled without requiring noticeably larger computational or memory capacity.

The means for achieving an alternating relative motion described above may be magnetic coils with appropriate armatures. Such an embodiment achieves a drive in which the frequency and amplitude of the oscillatory tool motion are easily controlled. These means may instead comprise other drive devices, for example, a fluid piston cylinder for achieving the shifting or sliding. The relative motion may also be achieved by means of a threaded or worm gear spindle, which is rotated back and forth in opposite directions by a drive. Other embodiments of these means are also possible.

Furthermore, according to the invention, the component of the travel path measuring system which is moved by means of the magnetic coils, is centered in a middle position when the magnetic coil is not energized, whereby this middle position forms the reference position for the path information of the CN-control, whereby, the null position of the carriage may be determined in a simple manner.

A device for distributing the signals supplied by the frequency generator to the magnetic coils is provided between the frequency generator and the magnetic coils, whereby the signal distribution is carried out dependent upon the slope angle, preferably the instantaneous slope angle, of the profile to be produced. By these simple means it is possible to follow the contour to be produced with sufficient accuracy, even during the oscillatory tool motions.

Another embodiment of the invention relates to a hydraulically controlled copying support, having a feeler-controlled copying valve, by means of which a regulatable pressurized hydraulic oil stream, which determines the velocity vector of the lathe tool, is distributed between the piston cylinder units which each drive either the lengthwise carriage or the crosswise carriage. A switching drum is driven by the main spindle with such a gear ratio that one rotation of the switching drum corresponds to one oscillation of the tool. The switching drum comprises at least two cam paths with cams, which activate cooperatively arranged switches. Through these switches, one cam path supplies the signal "feed advance forward" and the other cam path supplies the signal "feed advance reverse". The "forward" signal corresponds approximately to $$\left(1 + \frac{1}{2n+1}\right)$$

times the base feed advance, and the "breverse" signal corresponds approximately to $$\left(1 - \frac{1}{2n+1}\right)$$

times the base feed advance and these signals are supplied to the apparatus for achieving the oscillatory motion. This is an especially simple manner of achieving and controlling the desired oscillatory tool motions and feed advance motions, especially in feeler-controlled, hydraulically activated copy supports. The drive connection between the switching drum and the main spindle assures that a phase error between the frequency and the rotation speed of the main spindle cannot arise.

A gear shift drive or switching gear is further provided in the drive connection between the main spindle and the switching drum. This gear shift drive allows driving the switching drum with varying rotational speeds, thereby varying the oscillation frequency of the tools, even with a constant rotation speed of the main spindle.

A further embodiment of the invention relates to piston cylinder drive units for the crosswise motion and for the lengthwise motion. The piston cylinder unit for the crosswise motion has one cylinder chamber directly connected to a pressure source and the other cylinder chamber connected to the pressure source through a copy feeler valve. The other piston cylinder unit for the lengthwise motion has one cylinder chamber directly connected to the pressure source and the other cylinder chamber connected to a reservoir tank. According to the invention, the connecting lines for the piston cylinder unit for the lengthwise motion pass through a device for blocking and exchanging the hydraulic oil streams. The tank line passes through a pressure controlled blocking or check valve having a control input line directly connected to the pressure source. The connections as just described, of the device for blocking and exchanging the hydraulic oil streams, in conjunction with the described pressure-controlled blocking valve, provide the simplest manner in which the piston cylinder units providing the copy motion may be respectively set into oscillatory motion through a respective reversal of the oil flow. These oscillatory motions are always achieved along the line to be copied due to the distribution of the hydraulic oil stream through the copy feeler valve to the two piston cylinder units. Turning or lathe machines with the described copy controls are widely used and are easily modified as taught herein. Such already existing copy controls may be easily converted according to the above described embodiment, so that the tool may carry out the desired oscillatory motion together with the necessary feed advance.

The device for blocking and exchanging the hydraulic oil streams may be embodied as a four-path, three-position slide valve. This is a commercially available type of valve, which may easily be installed to achieve the desired effect in a simple and cost effective manner.

BRIEF DESCRIPTION OF THE DRAWINGS

In order that the invention may be clearly understood, it will now be described, with regard to a copy support for a wheel set turning machine as an example, with reference to the accompanying drawings, wherein:

FIG. 3 is a hydraulic circuit diagram according to the invention for controlling the copy support of FIGS. 1 and 2, for causing an oscillating tool feed advance;

FIG. 19a is a cross-section through the valve piston of the flow control valve of FIG. 16 under the control of the circuit of FIG. 18;

DETAILED DESCRIPTION OF PREFERRED EXAMPLE EMBODIMENTS AND OF THE BEST MODE OF THE INVENTION

Figure 1:
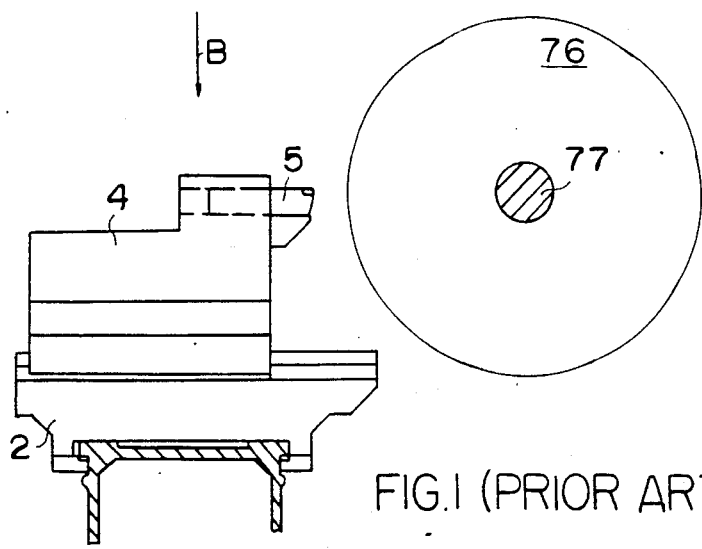
FIG. 1 is a side view of a conventional copy support for a lathe.
Figure 2:
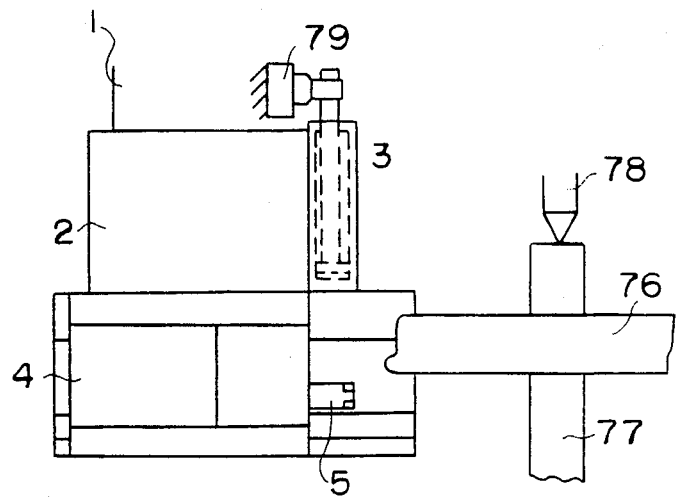
FIG. 2 is a view of the copy support in the direction of the arrow B in FIG. 1.

FIG. 1 is a side view of one possible conventional construction of a hydraulically controlled copy support of a wheel set turning lathe that can be controlled as disclosed herein, whereby FIG. 2 shows a top view of the lathe, in a direction of the arrow B of FIG. 1.

Lengthwise guides 1 are mounted on a machine bed not shown in further detail. The guides 1 serve to support and glidingly guide a longitudinal or lengthwise carriage 2 which may be driven along the length of the guides 1 by means of a piston cylinder unit 3. A crosswise carriage 4 is mounted in a known manner on the lengthwise carriage 2, to slide at an angle, preferably a right angle, with respect to the sliding direction of the lengthwise carriage 2. The crosswise carriage 4 is similarly driven by a conventional piston cylinder unit, not shown. The cross carriage 4 carries the tool 5.

The basic construction of a copying carriage as described above is known as such, and therefore does not require a more detailed description. Copying carriages of this construction may also be so constructed that the lengthwise carriage 2 does not ride directly on the lengthwise guide 1 of the machine bed. Instead, the lengthwise carriage 2 may be mounted on an intermediate carriage which is guided and supported by the lengthwise guide 1 in a slidable and lockable manner, and which in turn supports the lengthwise carriage 2. In such a construction, the mounting member 79 for the piston rod of the piston cylinder unit 3 is secured to the intermediate carriage rather than to the machine bed or frame as shown. Copy carriages of the two types described above are widely used, especially for wheel set turning machines, and have been proven quite satisfactory for such applications.

FIG. 3 is a hydraulic circuit diagram for the above described copy support. Known wheel set turning machines usually require two of such copy supports so that the two wheels 76 and 76' of a wheel set may be simultaneously machined. The wheel set axle 77 of a wheel set to be machined, is held at its ends by dead center points 78 and 78'. The views of FIGS. 1 and 2 show the left support of such a machine, whereas the view of FIG. 3 shows the right support of such a machine. In the right support, the right cross carriage 8 carries a tool 5'. A feeler 7 is provided to control the piston cylinder unit 6, which will be called the cross cylinder or crosswise cylinder in the following, for driving the crosswise carriage 8.

The piston cylinder unit 9, to be called the lengthwise cylinder in the following, and the cross carriage 8 are shown in an initial position in FIG. 3. As shown, the reservoir tank 84 is connected through the switch position 12 of the feeler valve 7 and further through the tank line 81 to the cylinder chamber 11 of the cross cylinder 6. If the feeler valve 7 switches to the switch position 14, the cylinder chamber 11 would be connected through the pressure line 19' to the pressure source 80. If the feeler valve 7 switches to the switch position 13, both the tank line 81 and the pressure line 19' would be blocked or closed.

The cylinder chamber 10 of the cross cylinder 6 is similarly connected to the pressure source 80 through the pressure lines 19'' and 19. The piston rod 6' of the cross cylinder 6 bears against the lengthwise carriage 2 and is secured thereto.

The lengthwise carriage 2 is slidably displaced by means of the piston in the lengthwise cylinder 9 which is secured to the frame mounting member 79' in a stationary manner. This arrangement differs from that of FIG. 2, but functions in the same way. The piston rod of the lengthwise cylinder 9 is secured to the lengthwise carriage 2. The cylinder chamber 9' of the lengthwise cylinder 9 is connected through the pressure line 19 to the pressure source 80 including a pressure pump 80'. The cylinder chamber 9'' of the lengthwise cylinder 9 is connected to the reservoir tank 84 through the line 81'. A pressure controlled stop or check valve 20 is arranged in the line 81'. The control line 82 for the stop valve 20 is connected to the pressure line 19. The lines 19 and 81' are connected respectively to the cylinder chambers 9' and 9'' of the lengthwise cylinder 9 through a valve 16 which is a so-called 4/3 path valve, that is, a slide valve with four ports and three switching positions. In the switching position of the valve 16 shown in FIG. 3, all connected lines are blocked or closed. The valve 16 serves for achieving the desired oscillatory tool motion, whereby the basic oscillatory motion of the valve 16 is converted into a controlled oscillatory motion of the two piston cylinder devices 6 and 9 which function as drives for the tools 5, 5'. The tool oscillatory movement is controlled by the feeler 7 tracing along a template 15, for appropriately controlling the hydraulic oil streams for the cylinders 6 and 9. Thus, the corresponding oscillatory motion of the tools 5 and 5' is controlled by the template 15 through the feeler 7, and the tool oscillates constantly along the contour determined by the template 15.

For describing the function of the apparatus it is assumed that at the start the valve 16 is in the switch position 17 and the valve 91, which is a valve similar to the valve 16, is in the switch position 102. The pressure controlled stop valve 20 located in the line 81' coming from the lengthwise cylinder 9, opens only when a certain pressure is achieved in the pressure line 19. This tripping pressure may be adjusted at the stop valve 20. This tripping pressure must be larger than the pressure necessary for achieving the motion of the cross cylinder 6 under cutting operation conditions.

The pressurized hydraulic oil for the cylinders 6 and 9 passes through a volume control valve 83 of the pressure source 80 in order to control its total volume. The oil first flows into the cylinder chamber 10 of the piston cylinder device 9, since the lengthwise cylinder 9 is blocked because the pressure controlled stop valve 20 is still closed due to insufficient pressure in the pressure line 19. Thus, the cross carriage 4' and the tool 5' are moved toward the wheel 76' of a wheel set which is held in place between dead center points 78 and 78'. Since the valve component of the feeler 7 is secured to the cross carriage 4', the feeler 7 comes into contact with the template 15 after a sufficient crosswise movement, whereby crosswise motion of the carriage 4' causes the valve of the feeler means 7 to switch from the switch position 12 to the switch position 13. It should be noted that the schematic view of FIG. 3 is on an enlarged scale, and actually minute movements are sufficient to switch the valve of the feeler 7. Feeler valves of this type are known in the art and therefore require no further description.

In the switch position 13 of the feeler valve, all lines connected thereto are blocked. The cross carriage 4' stops, whereby the pressure increases in the line 19 coming from the pressure source 80 for opening the pressure-controlled stop valve 20 so that the cylinder chamber 9'' of the lengthwise piston cylinder device 9 is connected through the switch position 17 of the valve 16 and through the line 81', to the reservoir or tank 84. Simultaneously, the cylinder chamber 9' is filled with pressurized hydraulic oil through the line 19, so that the respective piston 9a travels toward the right and the hydraulic oil in the cylinder chamber 9'' drains back to the reservoir tank 84 through the line 81'.

The above described activation of the lengthwise piston cylinder device 9 achieves a longitudinal motion of the lengthwise carriage 2. The speed of the carriage 2 is determined by the hydraulic oil volume supplied by the volume control valve 83. Due to this motion of the carriage 2, the feeler 7 comes in contact with a rising contour of the template 15 whereby the respective valve is switched to the switch position 14. In this switch position 14, the cylinder chamber 11 is filled with the pressurized hydraulic oil from the line 19'. Since the piston surface area of this cylinder chamber 11 is larger than the piston surface of the cylinder chamber 10, by an area depending on the piston rod cross-section, the hydraulic oil is pressed out of the cylinder chamber 10 through the lines 19" and 19 and supplied back into the line 19'. If the switch position 14 is completely switched-in or opened without any throttling effect, which occurs for example when the template 15 comprises a rather steep contour, then relatively large volumes of hydraulic oil are required for supplying the cylinder chamber 11, whereby the oil pressure in the line 19 and thus in the control line 82 decreases, whereupon the pressure-controlled stop valve 20 closes. When the stop valve 20 closes, the reservoir tank connection 81' for the cylinder chamber 9" of the piston cylinder device 9 is interrupted and the latter can not cause a longitudinal movement of the lengthwise carriage 2. If, however, the respective contour of the template 15 is not as steep, then the switch positon 14 is not fully opened, but rather only slightly opened with a throttling effect. In such a case the speed of the crosswise movement of the cross carriage 4' caused by the piston cylinder device 6 is smaller. The pressure drop in the line 19 and hence in the control line 82 is also smaller, so that the pressure-controlled stop valve 20 does not completely block the tank line 81', but merely acts as a throttle. Thus, a simultaneous movement of the lengthwise carriage 2 driven by the lengthwise piston cylinder device 9 is possible. In this manner a corresponding copying movement of the tool 5' can be achieved. Such a hydraulic copy control is known as such and hence does not need to be further described.

If the valve 16 is now switched from the switch position 17 through a middle position to the switch position 18, then the feed advance direction of the two piston cylinder devices 6 and 9 are reversed, so that the desired oscillation may be achieved through a simple switching of the valve 16 as just described. This oscillation is then controlled by the copy valve feeler 7, so that it is always directed along the copy line of the template 14.

Figure 4A:
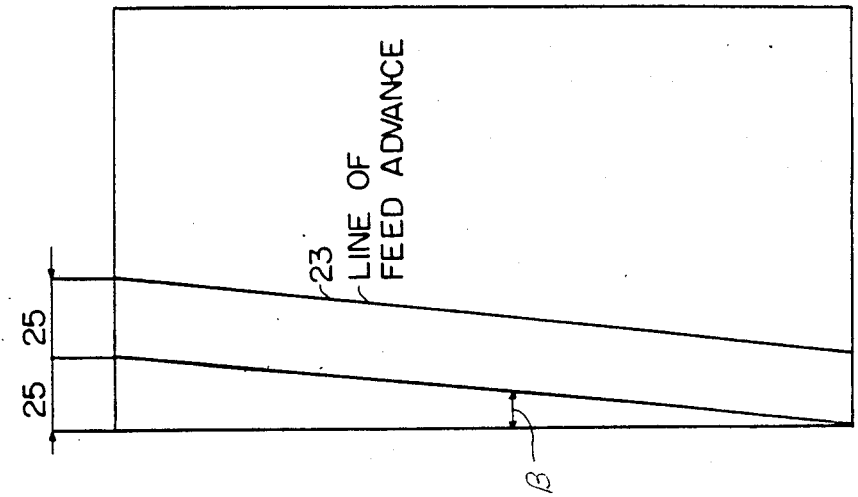
FIG. 4a is a similar view of a feed advance groove, but with a non-oscillating, conventional feed advance.
Figure 4:
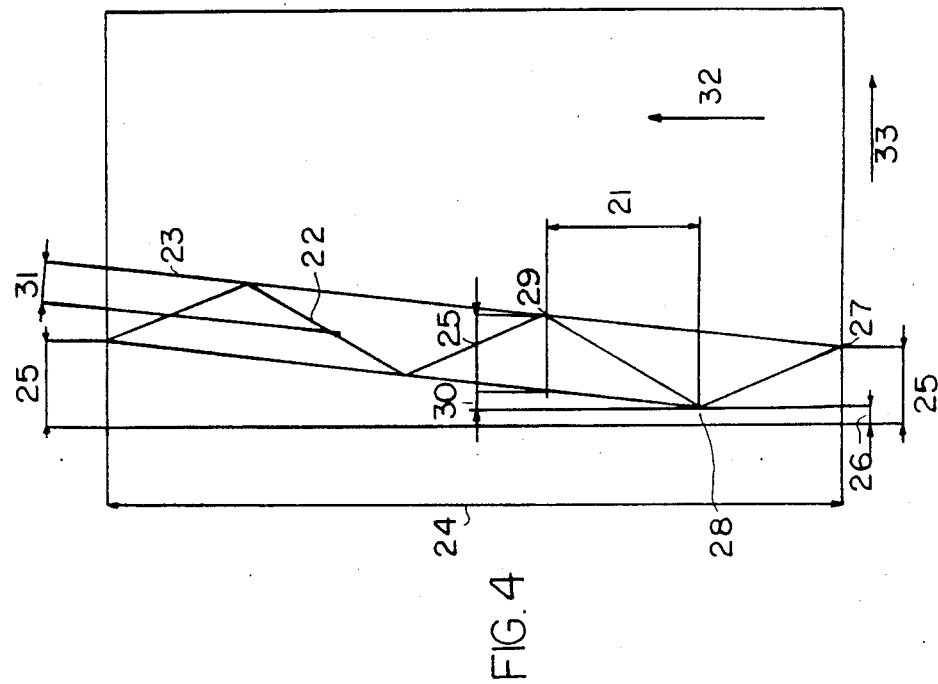
FIG. 4 is an enlarged view of a feed advance groove of an oscillating feed advance with an oscillation according to the invention.

FIG. 4 shows on an enlarged scale a schematic representation of a feed advance groove which was cut, for example, by the tool 5' during the machining of a wheel set with an oscillatory tool movement according to the invention. In contrast, FIG. 4a shows a feed advance groove produced by a continual feed advance without any oscillatory motion of the tool. The arrow 32 indicates the cutting direction, and the arrow 33 indicates the "forward" feed advance direction in FIG. 4.

A certain hydraulic oil volume is required for the continuous feed advance distance 25 during one revolution, for instance, of the wheel 76' which has a developed circumference 24. According to the invention, the amplitude 31 of the oscillatory motion of the tool 5' must be approximately one half of this feed advance distance 25, also called the base feed advance. In order to superimpose the oscillatory motion on a continuous feed advance, the base feed advance distance 25 minus the distance 26 must be covered by the tool for the oscillatory motion stroke from the point 27 to the point 28 in FIG. 4. The feed advance distance 26 corresponds to the base feed advance distance 25 divided by a value "z" which is the number of the half periods 21. To achieve the motion from point 28 to point 29, a base feed advance distance 25 plus the distance 30 corresponding to the distance 26 must be covered.

Figure 5:
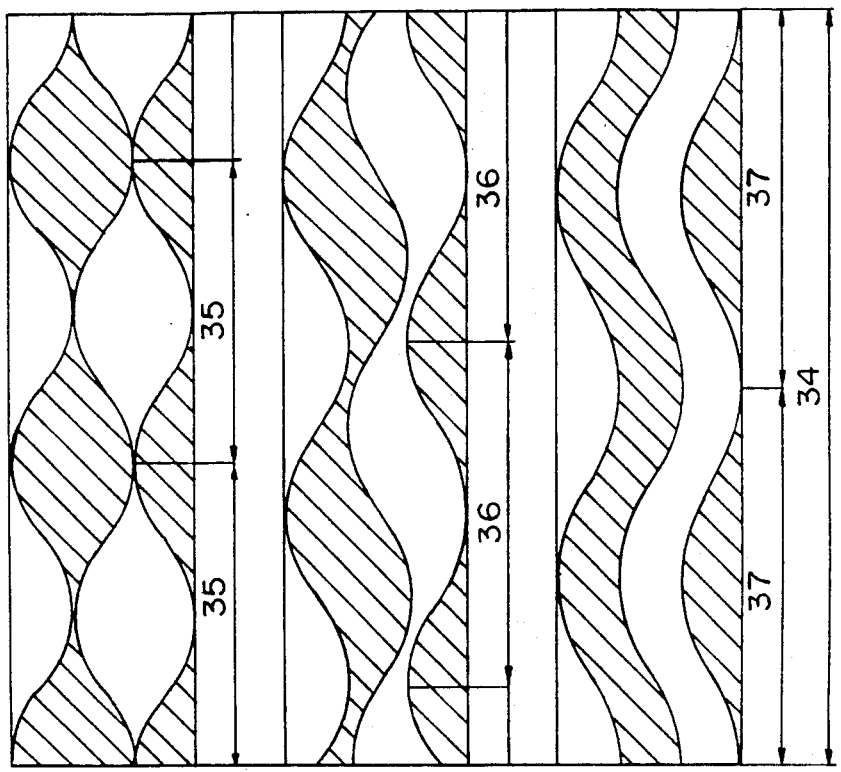
FIG. 5 illustrates schematically several feed advance patterns, whereby part I shows 2.5 wave lengths per one revolution of the work piece for a most effective chip breaking, part II shows 2.25 wave lengths per work piece revolution with a diminished breaking effect, and part III shows 2.0 wave lengths per revolution, substantially without any chip breaking effect.

The various views I, II, and III of FIG. 5 show possible oscillation forms of the oscillatory movement of the tool 5'. Basically, the view III shows a typical oscillation form according to the prior art, wherein it may be seen that chip separation will not be achieved because the chips have a uniform thickness. However, since in the prior art these oscillatory motions are not correlated with each other in their phase relation, a phase shift may occur so that after an appropriate number of work piece rotations an oscillation form may arise as shown in view II. With such an oscillation pattern, chip separation can also not be achieved with certainty. After further phase shifting, an oscillation form as shown in view I may arise. Only with such a phase relation is chip separation to be expected because the chip thickness is reduced substantially to zero at uniformly spaced intervals. Therefore, it is advantageous to enforce and maintain such a phase relationship as shown in view I of FIG. 5. All the views of FIG. 5 have the same work piece circumference 34 which may, for example, be the circumference of a wheel of a wheel set. View I shows an oscillation wave length 35, view II shows an oscillation wave length 36, and view III shows an oscillation wave length 37. As described above, a wave length 35 results in chip separation, and it may be seen in view I that the wave length 35 must have a magnitude in relation to the circumference 34, so that an odd number of half periods 21 (see FIG. 4) will arise along the circumference 34. Thus if "n" is the number of whole wave lengths occurring within a circumference 34, it is always true that $z=(2n+1)$, where z is the number of half periods 21 of FIG. 4. If this relationship is not maintained, a chip separation is substantially not achieved. This indicates that in the control according to the described example embodiments, the valve 16, see FIG. 3, must be switched back and forth with a specific frequency in synchronism with the wheel set rotation speed, or generally with the work piece rotation speed.

Figure 6:
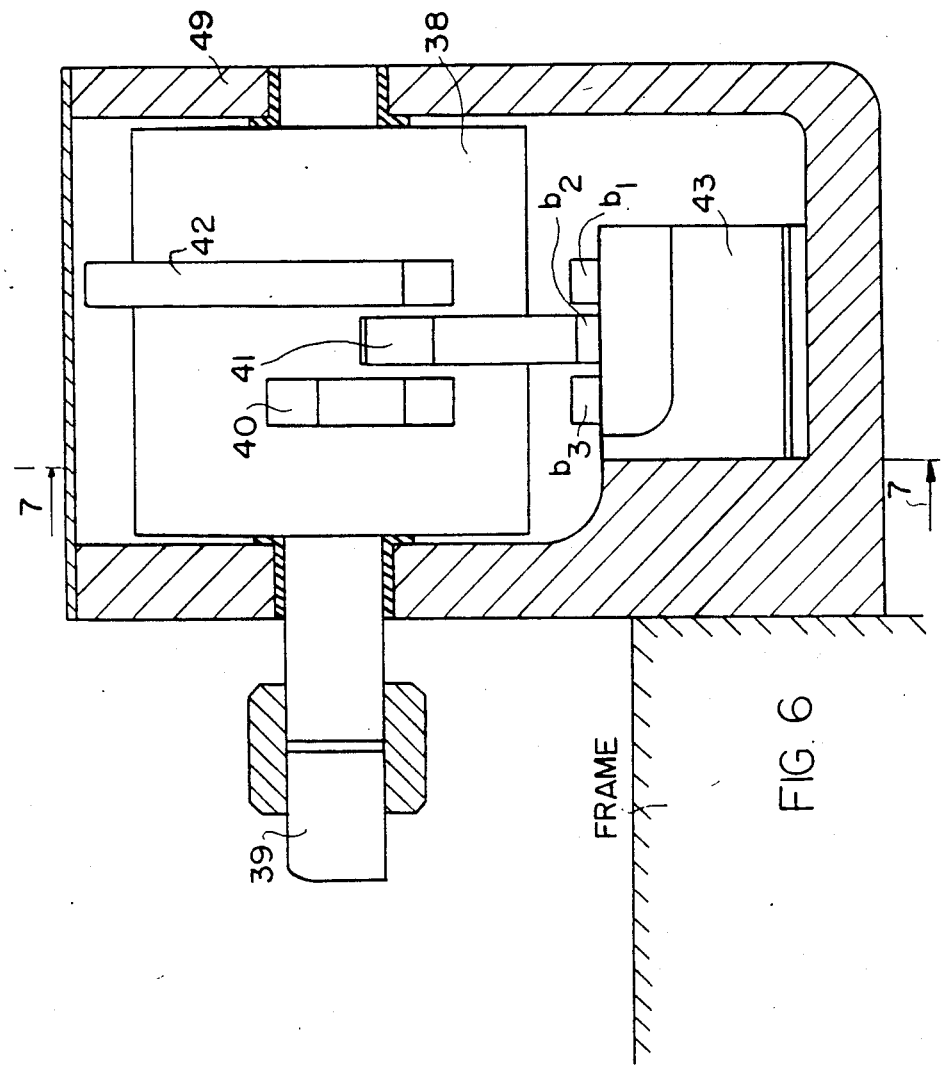
FIG. 6 is a partial section through a switching drum along section line 6—6 of FIG. 7.
Figure 7:
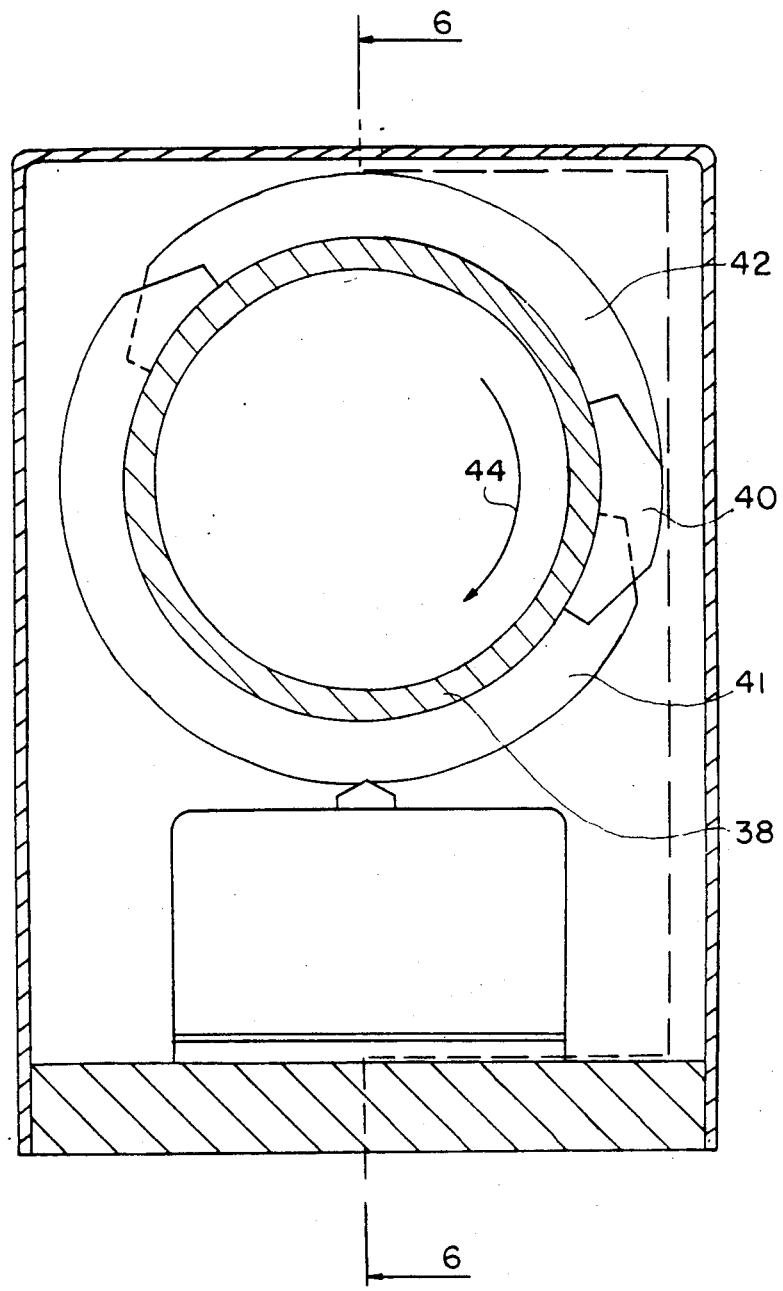
FIG. 7 is a section view through the switching drum of FIG. 6, along section line 7—7 in FIG. 6.

In this example embodiment, the command signals for this valve switch alternation are supplied by two electrical limit switches $b_1$, $b_2$ which together form a limit switch block 43 as shown in FIG. 6 also illustrating a switching drum 38 in a drum housing 49. To activate these switches, the switching drum 38 is driven by a shaft 39. Switching cams 41 and 42 are mounted on the drum 38 to activate the limit switches $b_1$ and $b_2$ of the limit switch block 43. The drum 38 rotates in the direction of the arrow 44 as shown in FIG. 7 illustrating the arrangement and extension of the switching cams 40, 41, and 42. The cam 42 controls the oscillatory motion opposite to the normal feed advance direction, while the cam 41 controls the oscillatory motion in the direction of the normal feed advance. The switch cam 40 cooperates with a limit switch $b_3$ to determine the shut-off point or the turn-on point of the oscillation. The limit switch $b_3$ may, however, beforehand be manually activated by means of keys $d_1$ or $d_2$, whereby key $d_1$ stops the oscillation and key $d_2$ starts the oscillation inward, (described in more detail below with reference to FIG. 11).

Figure 8:
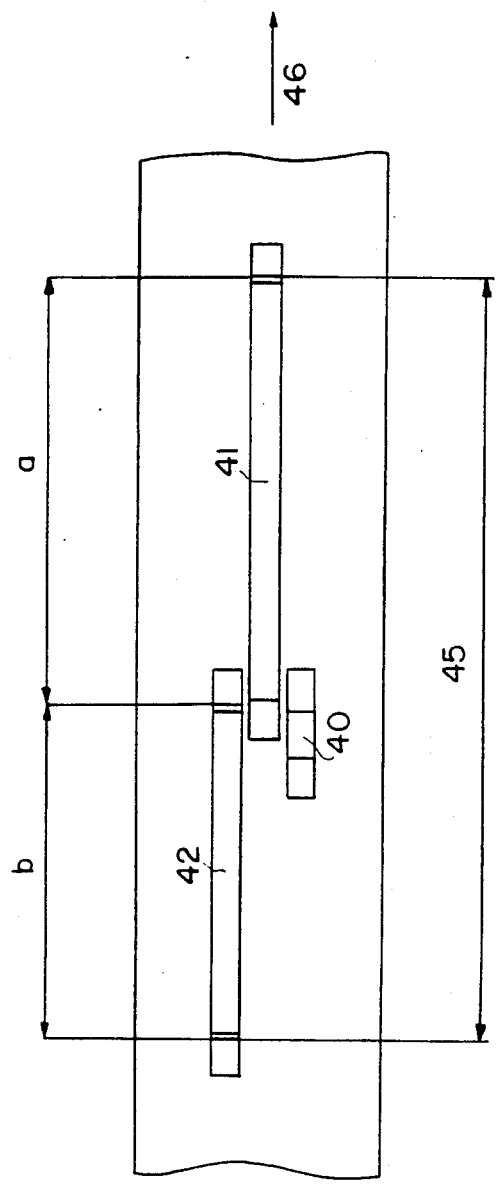
FIG. 8 is a developed projection of the switching drum circumference.

The developed projection of FIG. 8 further clarifies the arrangement of the switching drum. The limit switch cams 42 and 41 together cover the entire circumference 45 of the drum 38. The total circumference 45 is divided between the effective length b of the cam 42 and the effective length a of the cam 41 according to the ratio $$\frac{1 + 1/z}{1 - 1/z} = \frac{a}{b}.$$

The shut-off point of the oscillation lies in front of the cam 42 as seen in the direction opposite the rotation direction 46. This feature assures that the oscillation is shut-off or turned-on, when the oscillatory motion in the feed advance direction ends and the oscillatory motion in a direction opposite the feed advance direction is to begin.

Figure 9:
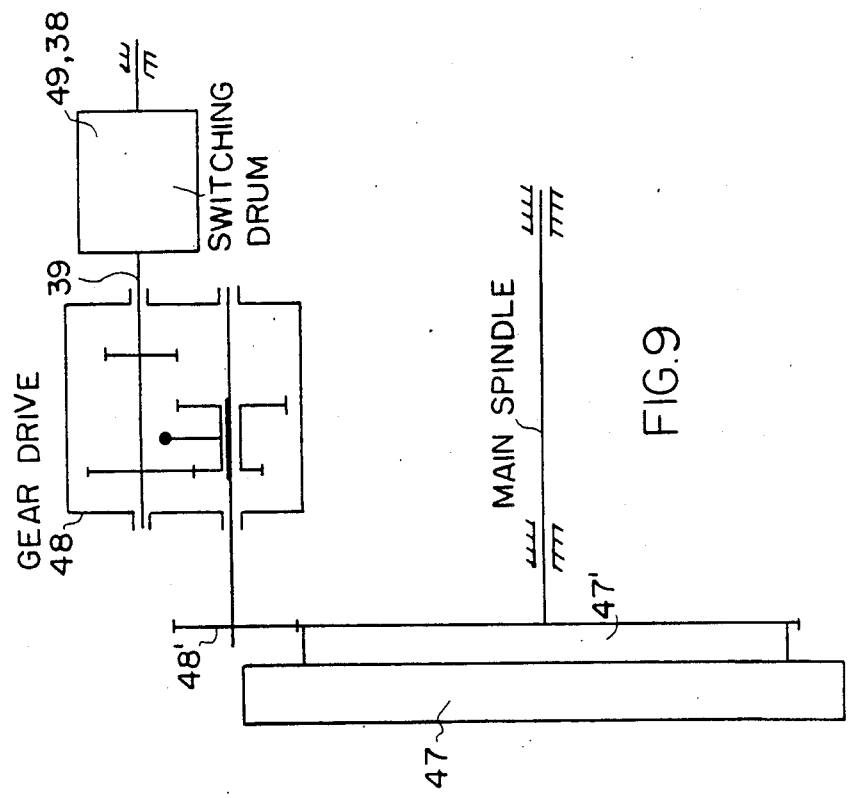
FIG. 9 is a schematic view of the drive for the switching drum as derived from the main drive spindle.
Figure 10:
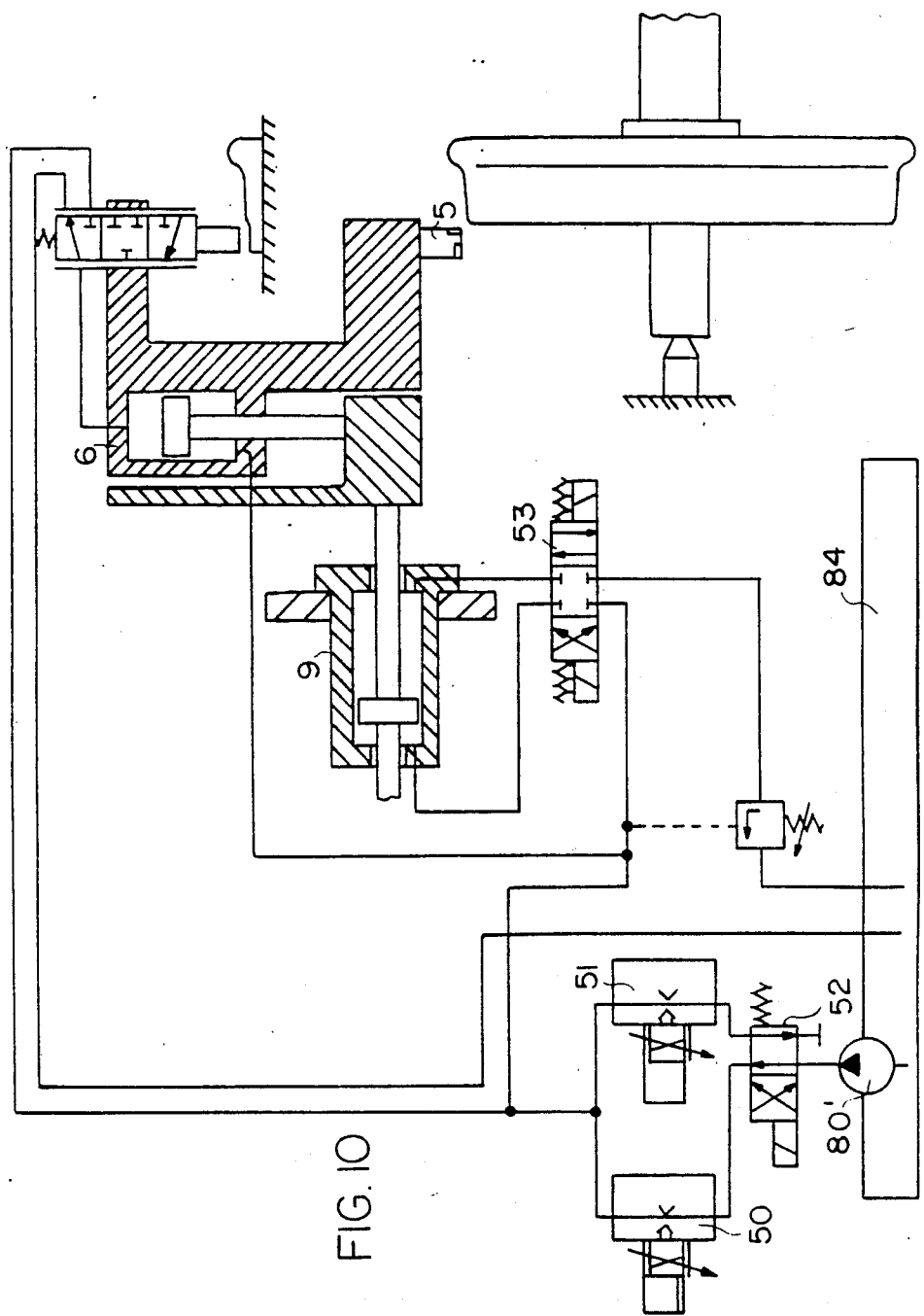
FIG. 10 is a schematic hydraulic circuit diagram similar to FIG. 3, illustrating a modified tool oscillation control.

FIG. 9 shows a schematic of a drive for the switching drum 38 in its housing 49. A face plate 47 of the wheel set turning machine described in the example embodiment is driven by the main spindle and has a drive gear 47' which drives a gear shift drive 48 through a gear 48'. The gear shift steps of the gear drive 48 serve to vary the rotational speed of the switching drum 38 in the housing 49 and therewith the wave lengths of the achieved tool oscillation. By varying this wave length of oscillation, the length of the separating chips may be varied and adjusted. For the sake of completeness, FIG. 10 shows a hydraulic circuit in which a volume control valve 50 and a further volume control valve 51 are arranged to cooperate with a pressure source 80'. These volume control valves 50 or 51 may be activated as desired by means of the valve 52. The volume control valve 50 is then adjusted to pass the hydraulic oil volume necessary for the oscillation feed advance, whereas the volume control valve 51 is adjusted to deliver the desired hydraulic oil volume for a continuous non-oscillating feed advance. The valve 53 corresponds in its structure and function to the valve 16 in the hydraulic circuit of FIG. 3. This arrangement of FIG. 10 provides a simple means for choosing an operation with an oscillatory feed advance or with a continuous feed advance of the tools. Especially in wheel set turning machines, it may be desired to occasionally drive the feed advance in a continuous manner, for example, if very hard areas of the wheel set are to be machined. In such hard regions a satisfactory chip separation is achieved anyhow, and therefore an oscillatory motion of the tool is not necessary.

Figure 11:
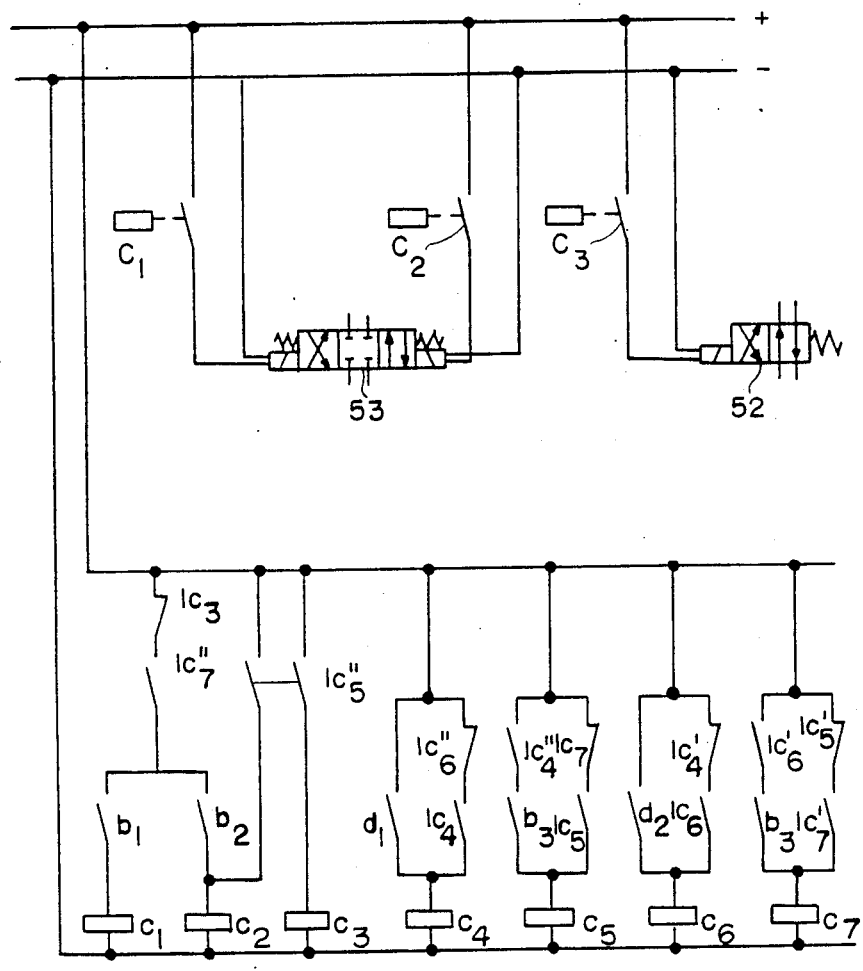
FIG. 11 is a schematic circuit diagram of an electric control for the oscillatory tool motion and for the continuous feed advance.

FIG. 11 shows an example of an electrical control for the oscillatory tool motion. The valve 53 controls the hydraulic oil flow for the feed advance motion of the lengthwise piston cylinder device 9. The magnets of the valve 53 are activated by relays $C_1$ and $C_2$. The valve 52 supplies hydraulic oil to the volume control valves 50 or 51. The switch magnet of the valve 52 is activated by a relay $C_3$. The reference letters and indeces used in the circuit diagram of FIG. 11 are as follows:

$C_1$–$C_7$: relays;
- $b_1$: limit switch cooperating with cam 42 of FIG. 7, activates "oscillatory feed advance reverse";
- $b_2$: limit switch cooperating with cam 41 of FIG. 7, activates "oscillatory feed advance forward";
- $b_3$: limit switch cooperating with cam 40 of FIG. 7, defines the turn-on and turn-off point for the oscillation operation;
- $d_1$: manually operated key to be pushed for switching the continuous feed advance "on" and the oscillatory feed advance "off";
- $d_2$: manually operated key to be pushed for switching the continuous feed advance "off" and the oscillatory feed advance "on";
- $1c_3$–$1c_7$: relay operated normally open and normally closed contacts directly operated by the corresponding relays $C_1$ to $C_7$.

The continuous feed advance is preselected by depressing the key $d_1$ in the circuit of the relay $C_4$ which is thus energized and closes its normally open, selfholding contact $1c_4$. Simultaneously relay $C_4$ opens its normally closed contact $1c_4'$ in the circuit of relay $C_6$ for preventing the closing of a selfholding circuit for relay $C_6$ as long as a continuous, non-oscillating feed advance is intended. As a result, the normally open selfholding contact $1c_6$ in the selfholding circuit of the relay $C_6$ and the normally open contact $1c_6'$ in the activating circuit of the relay $C_7$ remain open as long as the relay $C_6$ cannot form its own holding circuit because contact $1c_4'$ of activated relay $C_4$ interrupts the selfholding circuit of relay $C_6$, thereby preventing an oscillatory tool movement as long as the operator intends a continuous tool movement. With the activation of relay $C_4$ by the operation of the key $d_1$, the normally open contact $1c_4''$ in the activating circuit of the relay $C_5$ is also closed in preparation of the activating circuit of the relay $C_5$ with the next operation of the limit switch $b_3$ by the cam 40 on the switching drum 38. At the next closing of the limit switch $b_3$, the relay $C_5$ is actuated and closes its selfholding circuit by closing its normally open contact $1c_5$. The contact $1c_7$ in the selfholding circuit of the relay $C_5$ is a normally closed contact and relay $C_7$ cannot close its normally open selfholding contact $1c_7'$ as long as relay $C_5$ is energized and hence opens its normally closed contact $1c_5'$. Due to the energizing of relay $C_5$, the ganged normally open relay contacts $1c_5''$ are closed for energizing relays $C_2$ and $C_3$, whereby normally open contacts $c_2$ and $c_3$ are now closed for energizing respective operating magnets for the valves 53 and 52 respectively. The valve 52 thereby becomes switched into the crossed switch position. The volume control valve 51, in FIG. 10, now supplies the copy system with a hydraulic oil quantity appropriate for a continuous feed advance. The path valve 53 supplies constant feed advance oil to the lengthwise piston cylinder device 9 since the relay $C_2$ has similarly been activated and has pulled the valve 53 into the uncrossed switch position.

If now the oscillating feed advance is to be activated, the push key $d_2$ must be operated by the operator, whereby the relay $C_6$ is activated and closes its normally open selfholding contact $1c_6$ in its selfholding circuit while simutaneously opening its normally closed contact $1c_6''$ in the selfholding circuit of the relay $C_4$, whereby the relay $C_4$ is denergized since the push key $d_1$ has been released and hence is open. The deenergizing of relay $C_4$ closes its normally closed contact $1c_4'$ in the selfholding circuit of relay $C_6$. Push key $d_2$ must be pushed long enough for the closing of the contact $1c_4'$ to prepare the selfholding circuit of the relay $C_6$. The normally open contact $1c_6'$ of now energized relay $C_6$, in the energizing circuit of relay $C_7$ closes and allows the activation of relay $C_7$ upon closing of the limit switch $b_3$. Relay $C_7$ closes its normally open selfholding contact $1c_7'$ and interrupts the selfholding circuit of relay $C_5$ by opening its normally closed contact $1c_7$, whereby relay $C_5$ cannot remain self-excited. Therefore, normally closed contact $1c_5'$ in the selfholding circuit of relay $C_7$ allows relay $C_7$ now to be self-excited.

The energized relay $C_7$ now closes its normally open contact $1c_7''$, whereby the oscillatory feed advance is switched on by means of the contact $1c_7''$ in the energizing circuit of relays $C_1$ and $C_2$, because the normally closed contact $1c_3$ in the energizing circuit of relays $C_1$ and $C_2$ is closed. Normally closed contact $1c_3$ prevents the simultaneous switching on of both feed advance types. The limit switches $b_1$ and $b_2$ are now operated by the switching drum 38, and the valve 53 supplies the lengthwise cylinder 9 with pressurized hydraulic oil in alternating directions. The valve 52 now supplies the volume control valve 50 with hydraulic oil. This switching arrangement allows selecting the desired type of feed advance at any particular point of time during a turning operation.

Relays $C_4$ and $C_6$ store the information, because the desired feed advance type is only switched on by the relays $C_5$ and $C_7$ when the cam 40 activates the limit switch $b_3$ which prepares a respective energizing circuit for the relays $C_5$ and $C_7$. Thus, in the described circuit of FIG. 11 the feed advance types are locked in opposition so that a faulty switching, such as the activation of both feed advance types simultaneously, is prevented.

The method of the invention achieves for the first time a desired chip separation or chip breakage in a methodically reliable manner. Simultaneously, the present method may be used independently of the work piece contour to be produced by the tool. An apparatus appropriate for carrying out the method according to the invention is relatively simple, and in many cases, it is possible to improve or upgrade existing machines and their controls so that they may carry out the method according to the invention.

Figure 12:
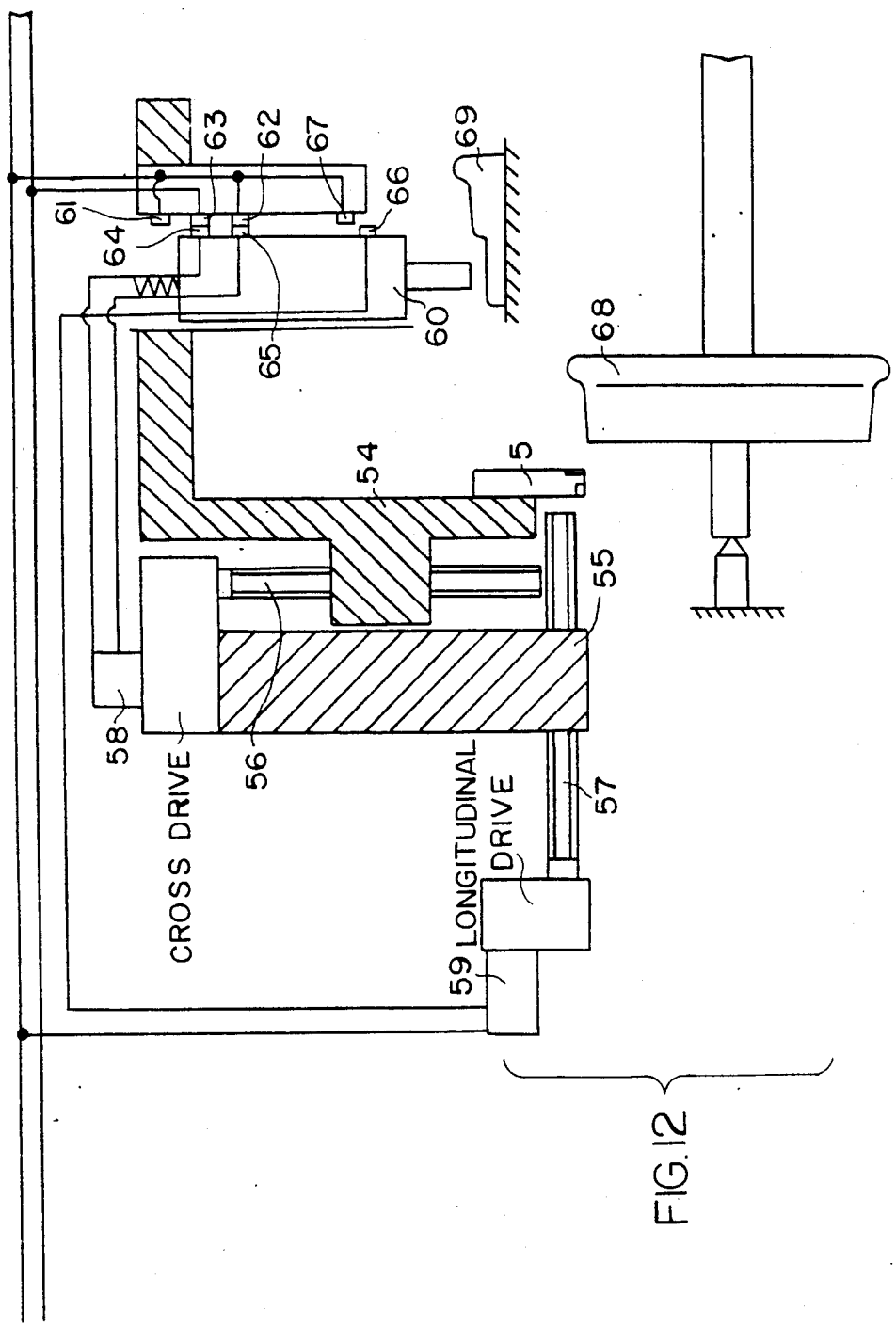
FIG. 12 is a partial sectional view of an electrical copying control for a non-oscillating tool feed advance operation.

FIG. 12 shows a diagrammatic sketch of a copy support with an electric copy control. A cross carriage 54 is moved by means of a spindle 56 driven by a direct current motor 58 through a drive transmission. A lengthwise carriage 55 is similarly moved by means of a spindle 57 driven by a direct current motor 59. The feed advance magnitude is controlled in a known manner through control of the current supply. The cross carriage spindle 56 is controlled by an electrical copy feeler 60. The contacts 61, 62, 63, 64 and 65 serve for reversing the polarity of the power supply for the cross carriage motor 58, which is a d.c. motor, depending on the necessary feed advance direction. The contacts 66 and 67 serve for activating the lengthwise feed advance motor 59. The feeler 60 is shown in an initial or start ready position. The feed advance motor 58 moves the cross carriage 54 toward the wheel set 68, whereby simultaneously the feeler 60 approaches and comes into contact with a template 69. This crosswise motion continues until the contacts 62 to 65 are separated. In the transition phase the feed advance motor 59 for the lengthwise axis will already be turned on. When the contacts 62 to 65 are completely separated, only the lengthwise feed advance will be turned on by the contacts 66 and 67. The contacts of the copy feeler 60 are switched on and off corresponding to the profile slope of the template 69. For example, if the feeler 60 is pressed further by an increasing or upward sloping profile, then contacts 64 and 61, and contacts 65 and 63 will come into contact. In contrast to the initial position, the polarity supplied to the feed advance motor 58 of the cross carriage 54 is reversed, and the carriage 54 moves away from the wheel set 68. Thus the cross carriage 54 follows the profile of the template 69 to be copied.

Figure 13:
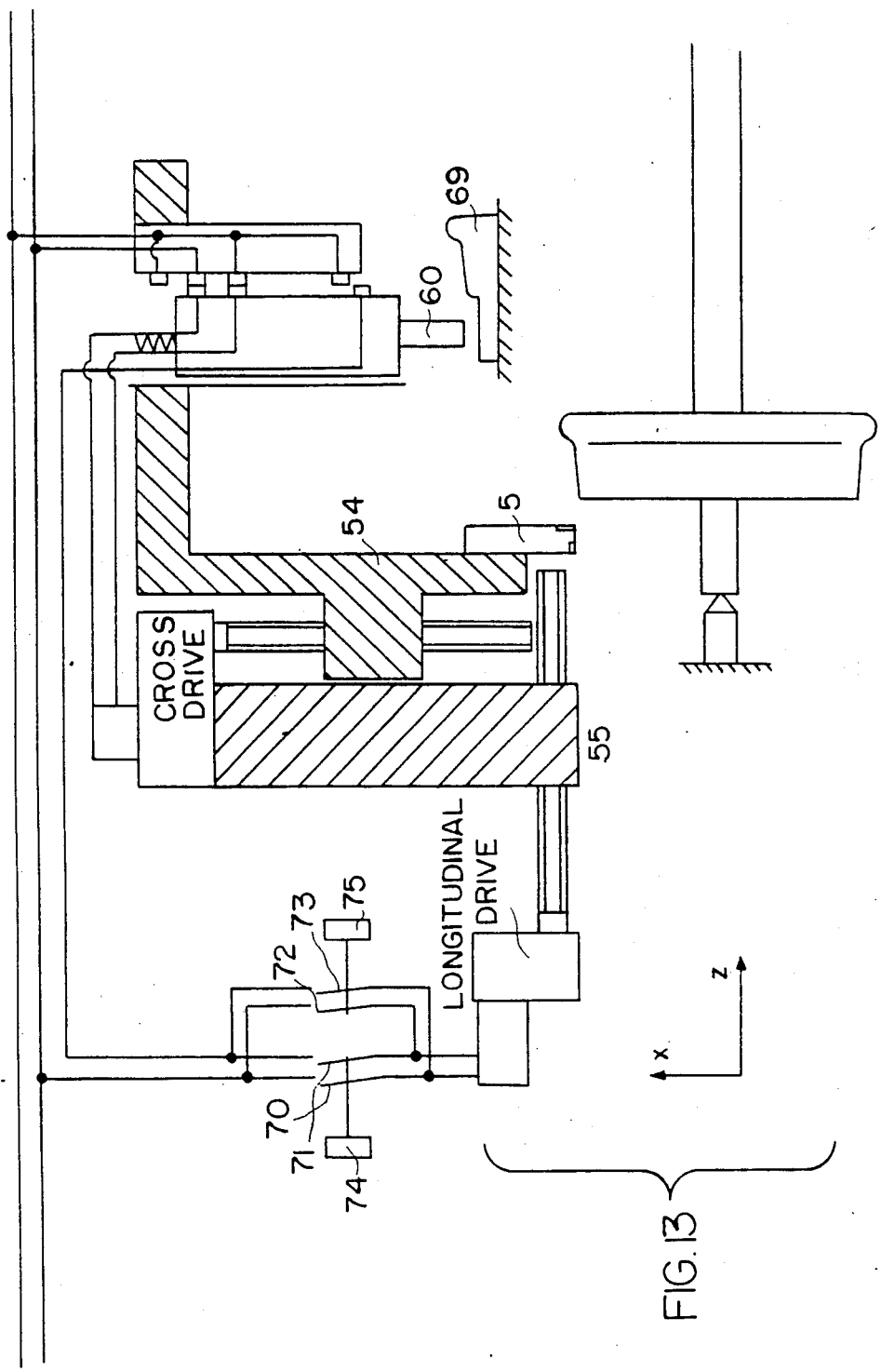
FIG. 13 shows another electrical copy control for an oscillating tool feed advance operation.

FIG. 13 shows an electric copy control arranged in the apparatus of FIG. 12 for carrying out an oscillatory feed advance. The switches 70 and 71 close for causing a lengthwise feed advance in the z-direction, and the switches 72 and 73 close for achieving a feed advance in a direction opposite to the z-direction.

The switches 70 to 73 are operated by the relays 74 and 75 as shown in FIG. 13. The relays 74 and 75 are controlled respectively by the limit switches $b_1$ and $b_2$ of FIG. 6. The feed advance of the lengthwise carriage is now controlled by the commands of the switching drum 38, so that now an oscillating feed advance is achieved.

The time duration for the feed advance "forward", in the z-direction, and for the feed advance "reverse" opposite the z-direction, is "switched" in the ratio $$\frac{1 + 1/z}{1 - 1/z}.$$

Due to the motion of the lengthwise carriage 55 in the z-direction, the feeler 60 moves along the copying template 69, and thereby achieves a cross-motion of the cross carriage 54 corresponding to the profile contour of the template 69. In the previously described hydraulic copying control, the oscillation of the cross-cylinder is dependent upon the angle of slope of the template and the oscillation of the lengthwise cylinder. In this electrical oscillation control, the lengthwise carriage may oscillate independently of the above mentioned factors.

For a purely crosswise machining, such as for example turning the flat surfaces of the wheel set, the lathe machining process cannot be carried out with an oscillating feed advance, since in this case the copy feeler constantly remains in one switching position, whereby the cross-cylinder performs a constant feed advance. The valve which switches on the oscillatory motion is only effective on the lengthwise cylinder and is therefore not effective when the cross-cylinder drives the tool for machining the flat wheel surface. If a conical surface with a large slope angle of more than 45° is to be turned, then the crosswise motion is larger than the lengthwise motion during the oscillation. If the slope of the cone becomes too steep, for example, 80° or even 90°, an exceedingly large excursion of the feeler is necessary for supplying the cross-cylinder with the necessary quantity of hydraulic oil within the short period of time determined by the oscillation frequency. If the slope angle approaches the pure plane or cross-direction (90°), a clean oscillation in a direction tangential to the profile is no longer achievable. The excursions of the feeler become too great and lead to deviations of the oscillatory motion from the desired contour. However, surfaces having a large slope angle, such as for example approximately 80°, may be machined with an oscillating feed advance by means of the above described hydraulic and electrical copy systems. Where it is necessary to machine conical surfaces with a large slope angle and also to machine flat "crosswise" surfaces with an oscillating feed advance, a different copy control must be used.

Figure 14:
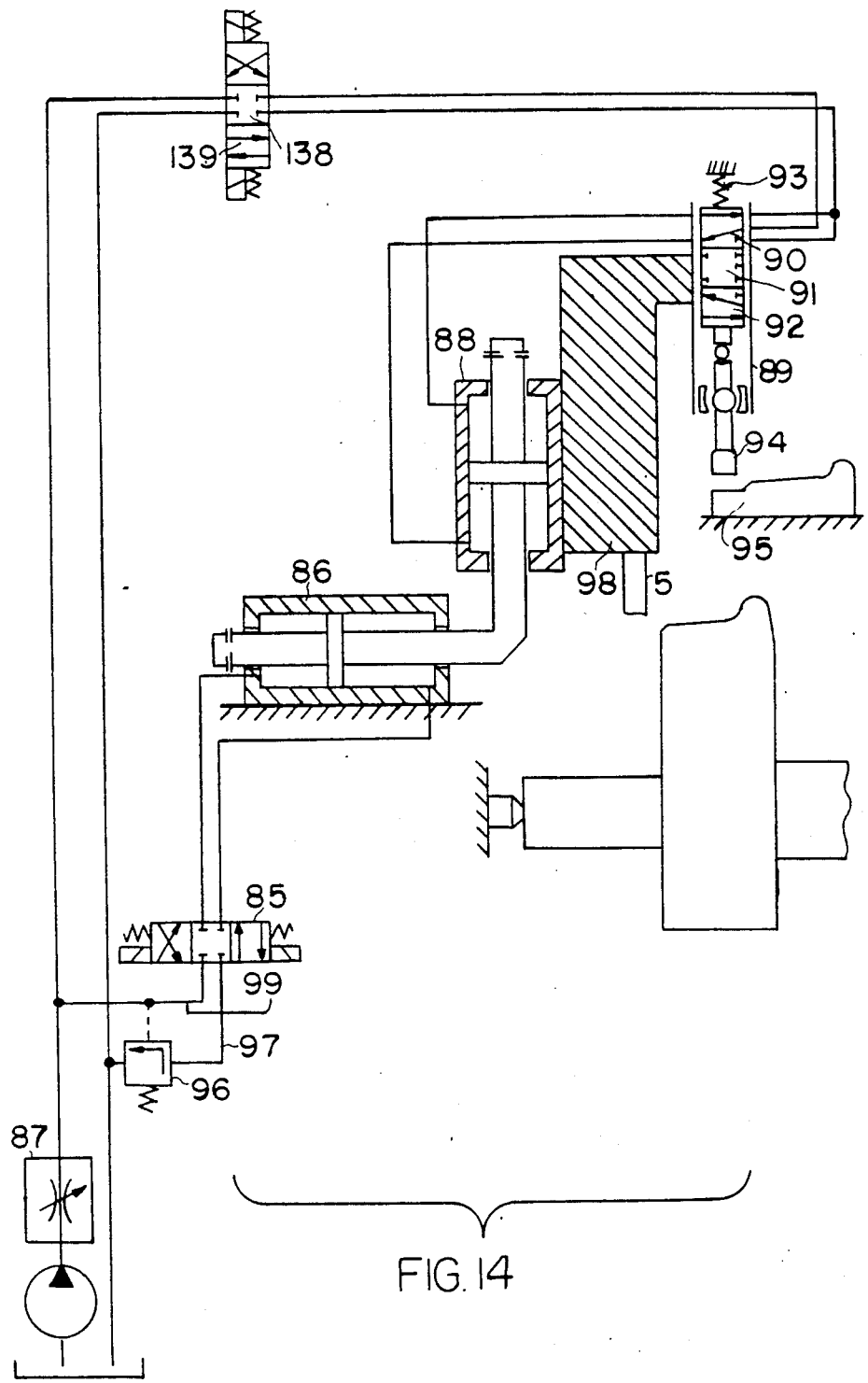
FIG. 14 shows a hydraulic circuit diagram for another embodiment of a copy control with an oscillating tool movement.

FIG. 14 shows the basic construction of such an altered copy control, which uses a so-called four-edged feeler 89. A valve 85 supplies pressurized hydraulic oil to the lengthwise piston cylinder device 86. Depending upon the switching position of the valve 85, the general feed advance direction, the so-called guide feed advance, "forward" or "reverse", may be selected. In order to achieve this selection the valve 138 is in the shown switched postion 139. The complete copy arrangement is supplied with a defined quantity of hydraulic oil through the valve 87, so that a feed advance of a desired magnitude is achieved. If the feeler head 94 of the feeler 89 is not contacting the template 95, the spring 93 moves the feeler 89 into an initial switch position 90.

Since the valve 96 closes the tank line 97, the stream of hydraulic oil supplied by the volume control valve 87 flows through the fully opened feeler control ports to the cross-feed piston cylinder device 88. The valve 96 is adjusted to an opening pressure which is much greater than the operating movement pressure of the piston cylinder device 88, whereby the latter moves the carriage 98 toward the wheel profile, whereby the feeler head 94 of the copy feeler 89 contacts the template 95, and slowly switches the feeler 89 to the switch position 91.

If, in this connection, the control gap cross-sections of the copy feeler valve 89 have been reduced to a desired intermediate value, then the pressure increases in the supply line and the hydraulic oil supplied constantly by the volume control valve 87 and not used up, flows to the carrier feed advance cylinder 86, since the valve 96 is now opened due to the increased pressure in the line 99, and since the line 97 was opened as a connection from the piston cylinder device 86 to the reservoir tank. The velocity of movement of the piston of the piston cylinder device 88 is reduced, due to the portion of the hydraulic oil stream which flows to the cylinder 86. The feeler head 94 is now guided along the template 95 corresponding to the guide feed advance, and the valve of the feeler 89 is thereby activated to switch positions 90 or 92, depending on the slope of the template 95, so that the cross piston cylinder device 88 follows the template slope.

Figure 15:
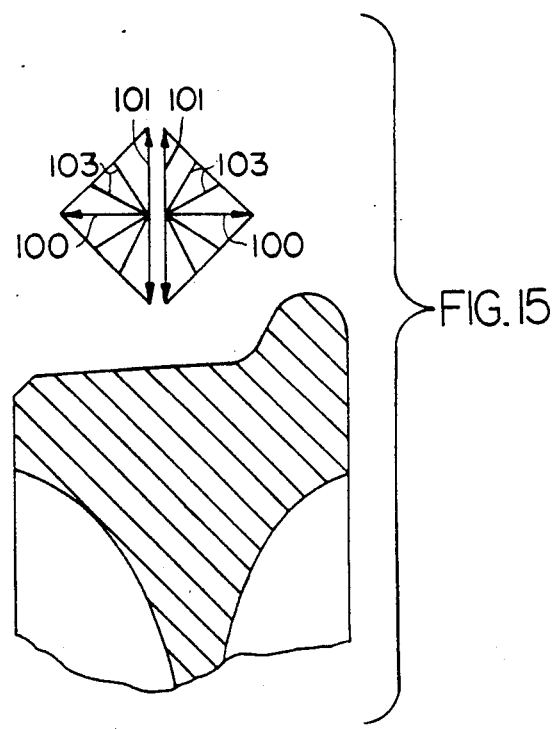
FIG. 15 is a velocity diagram of the speeds of the oscillating tool movements.

If the piston cylinder devices 88 and 86 both have the same piston surface area, then the velocity diagram of FIG. 15 illustrates the resulting motion of the support, or more specifically, the motion of the lathe chisel point. The vector arrow 100 shows the velocity resulting when only the guide feed advance is used. The arrow 101 gives the velocity of a pure crosswise directed movement, that is a movement caused by the piston cylinder device 88. The arrows 103 give various resultant velocities of various copy directions comprising velocity components in both directions 100 and 101.

Figure 16:
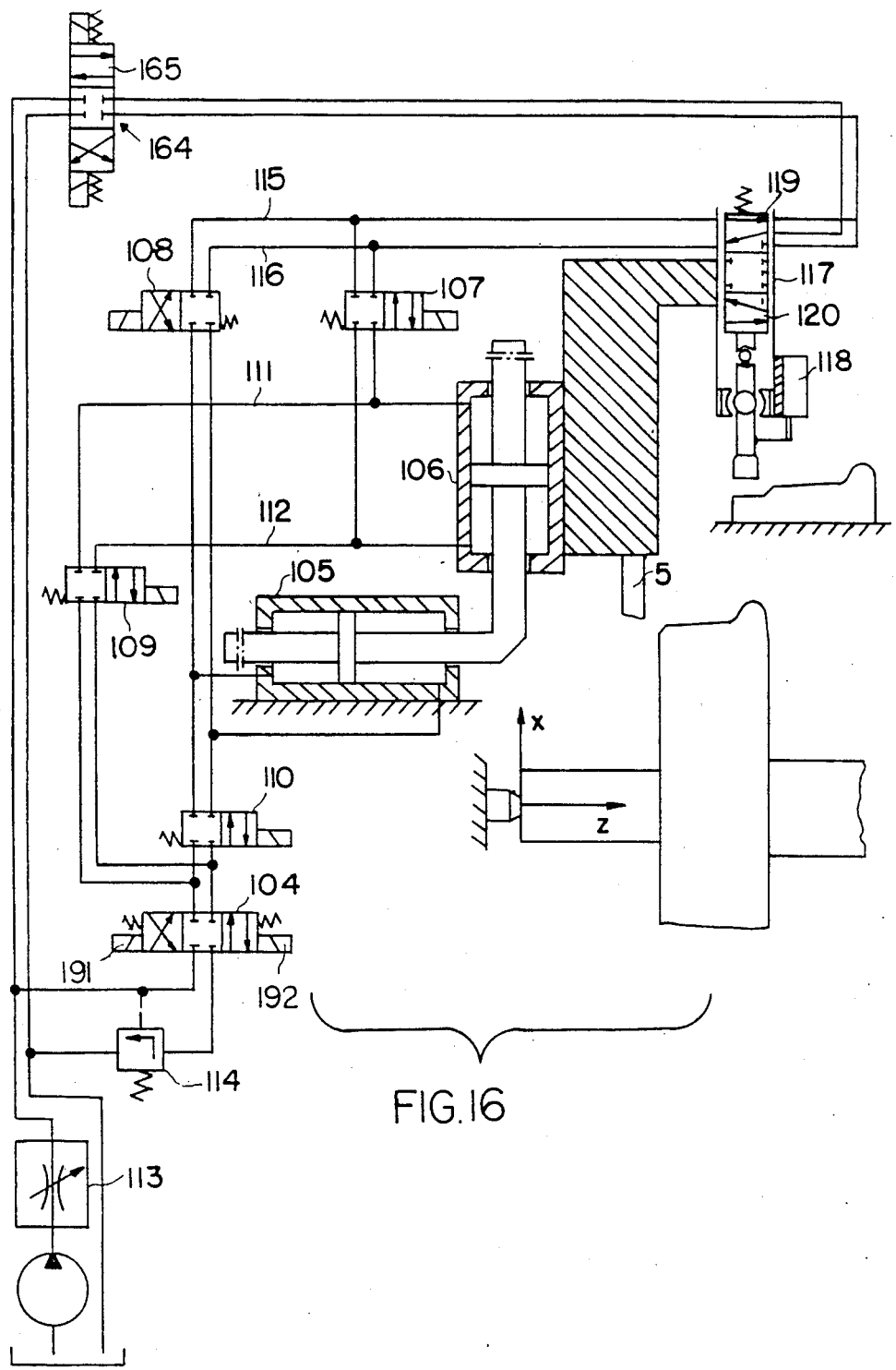
FIG. 16 shows another hydraulic circuit for another embodiment of a copy control with an oscillating tool movement.

FIG. 16 shows a copy arrangement which is suitable for carrying out an oscillating feed advance even for a purely crosswise feed advance. This type of control makes it possible to select either the lengthwise piston cylinder device 105 or the crosswise piston cylinder device 106 as the guide feed advance cylinder. The copy feeler 117 then controls the respective other cylinder. Thus, it is possible that always that cylinder, of the two cylinders, which has to carry out the smaller movement, is controlled by the copy feeler 117 and the respective valve 119. Such or similar copy control arrangements with reversible cylinder functions are known in milling machines as so-called quadrant controls.

The reversal control of the cylinder functions proceeds as follows. The valve 164 is in the switching position 165. The valves 108 and 109 are switched to a locked or closed position and valves 107 and 110 are completely opened, then the copy control described with reference to FIG. 14 results.

A valve 104 determines the guide or lead feed advance direction and may be used to control the oscillatory feed advance. This valve 104 may be controlled, as described, for example by means of a switching drum 38. If the cross piston cylinder device 106 is to achieve the guide or lead feed advance movement, then the valves 108 and 109 must be switched to an open position, and valves 107 and 110 must be closed. The cross piston cylinder device 106 is supplied by hydraulic oil through the lines 111 and 112, and achieves the guide or lead feed advance dependent upon the quantity of oil which is supplied by the volume control valve 113 whereby the direction of the guide or lead feed advance is determined by the position of valve 104. A valve 114 is arranged in this circuit in the reservoir tank line of the guide or lead feed advance cylinder.

The lengthwise piston cylinder device 105 is connected to the copy feeler or template sensor 117 through the lines 115 and 116, so that now the lengthwise piston cylinder device 105 is guided according to the profile of the template. The switching-over to the respective other piston cylinder device may be manually achieved by the operator, but it may be an automatic function if desired. A displacement transducer or sensor 118 is provided for monitoring the feeler movement during the oscillating feed advance, for the purpose of automation.

As described above, the feeler excursions are particularly large if the oscillation is to be carried out along a profile section with a large slope angle.

During the oscillation, the feeler or template sensor 117 alternates between its switching positions 119 and 120. The transducer 118 will determine an oscillation between a maximal and minimal value, and supply an oscillating output magnitude, for example an oscillating voltage. The difference between the maximal and minimal value must be determined and evaluated by a control. If a certain, given feeler excursion is exceeded, the cylinders of the support are caused to exchange their functions. The specific adjustments of the maximal magnitude of the feeler excursion which triggers the cylinder function reversal, is dependent upon the components used and especially upon the cylinder surface areas. In FIG. 16 the surfaces of both cylinders are of equal size. In turning or machining a 45° cone, the magnitude of movements of the lengthwise and crosswise piston cylinder devices are equal. In this case, if the piston surfaces of the cylinders are equal in size, then the hydraulic oil flows to each cylinder are also equal. If the slope angle becomes greater than 45°, for example at an angle of 50°, it is reasonable to shift the guide or lead feed advance from the lengthwise cylinder to the crosswise cylinder. If then the slope angle drops below 45° the lengthwise piston cylinder device must again take over the function of the guide or lead feed advance.

Figure 17:
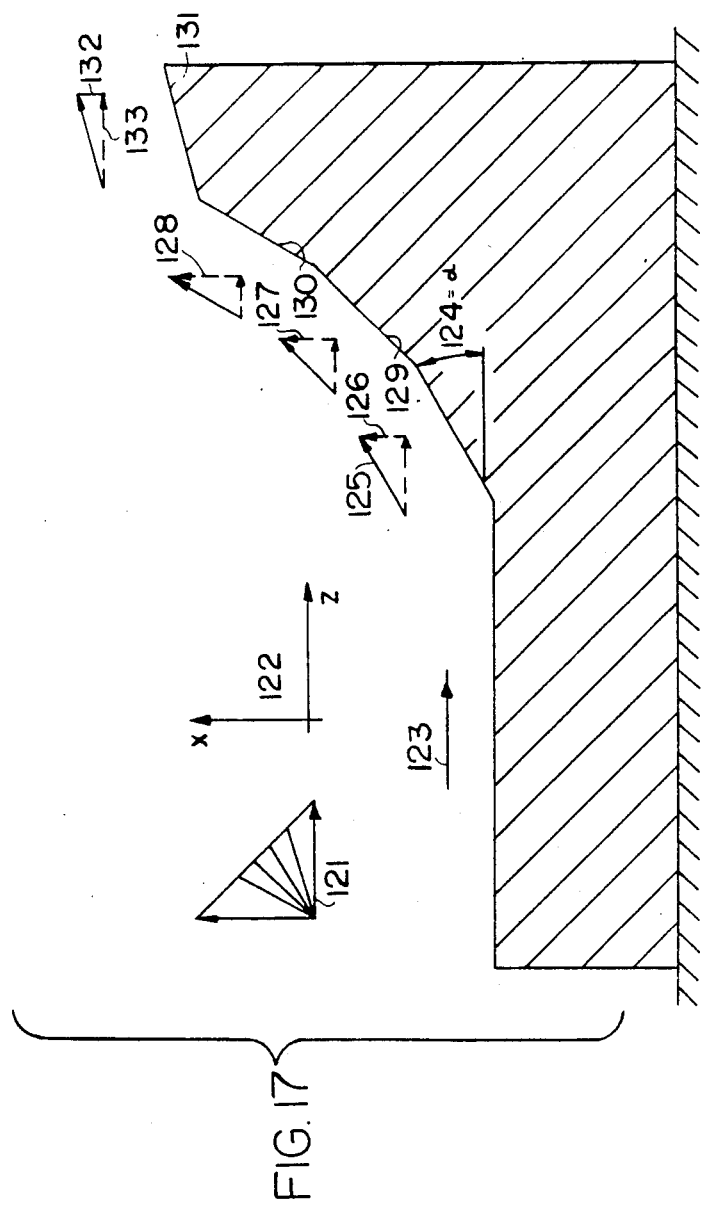
FIG. 17 shows a partial sectional profile view of a template serving as a guide for the machining operation, for example, for finish machining a railroad wheel.

FIG. 17 shows an example template profile, which is to be copied. The coordinate axes 122 show the arrangement of the template in relation to the entire support, and the velocity diagram 121 shows the velocity vectors which are realized at a certain angle between the contour of the template and the support. If a purely cylindrical surface is being machined, the arrow 123 results. As the slope angle 124 increases, the cross-cylinder must carry out increasingly larger movement as shown by arrows 126, 127, and 128. The arrow 125 shows the resultant motion for a conical surface with a small slope angle. The velocities are distributed according to the velocity diagram 121. In the region of the second conical section 129, with approximately a 45° slope angle, the lengthwise and crosswise movements are of equal magnitude. It is reasonable not to adjust or set the reversal point for the lead or guide feed advance reversal exactly to a 45° slope angle conical surface, since the copy feeler must carry out the same motions after the reversal, since both cylinders require equal oil volumes. Only when an angle of, for example, 50° slope is exceeded, shall the reversal be carried out. This is the case in the next profile section 130. The lengthwise piston cylinder device 105 is now controlled by the copy feeler which rides along the profile section 130. Since the crosswise piston cylinder device 106 has now taken over the function of the guide or lead feed advance, a purely crosswise surface may also be machined with an oscillating feed advance.

In the last profile section 131, the slope angle is smaller than 45°. Since the reversal point for the alternation of the carrier feed advance from the lengthwise piston cylinder device 105 to the crosswise piston cylinder device 106 was set at a 50° slope angle, now the reversal back to the initial cylinder functions will be carried out when the slope angle falls below 40° since then the same movements occur at the copying feeler 117. The corresponding vector diagram indicates that the crosswise motion 132 controlled by the copy feeler 117 is smaller than the lengthwise motion 133.

Setting the reversal points in the above described manner, has the advantage that these points bring about an exact separation of the two operating conditions, with the guide or lead feed advance performed by either the lengthwise 105 or the crosswise 106 piston cylinder device.

Figure 18:
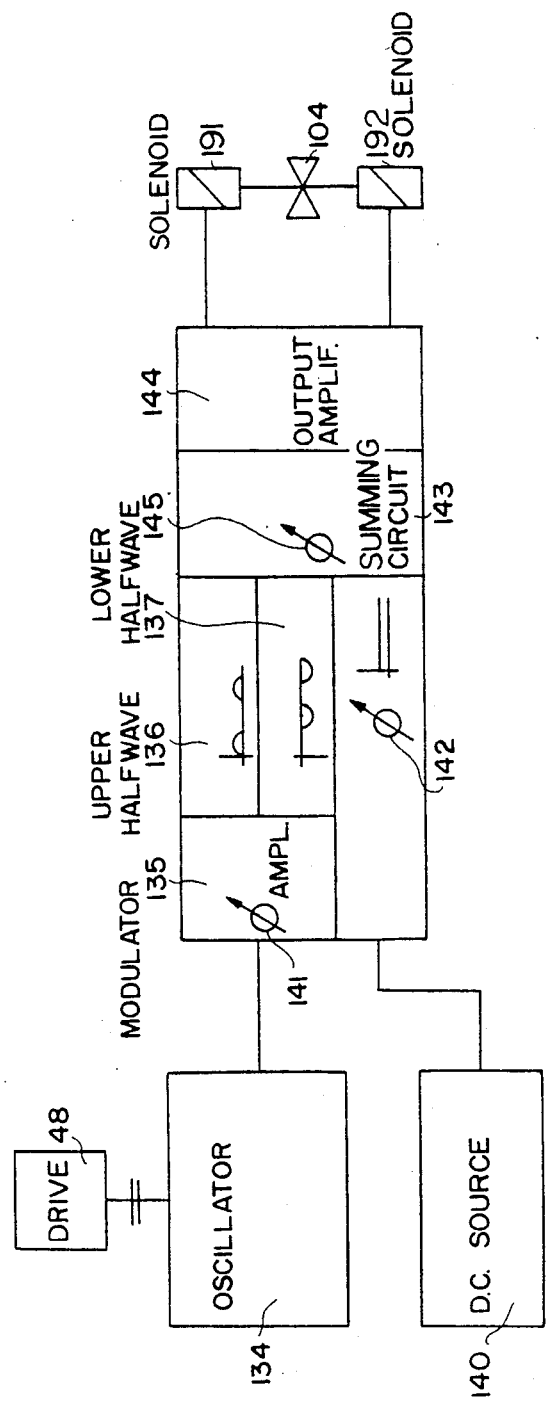
FIG. 18 is a block circuit diagram of an electronic control for a flow control valve as used in the hydraulic circuit of FIG. 16.
Figure 19:
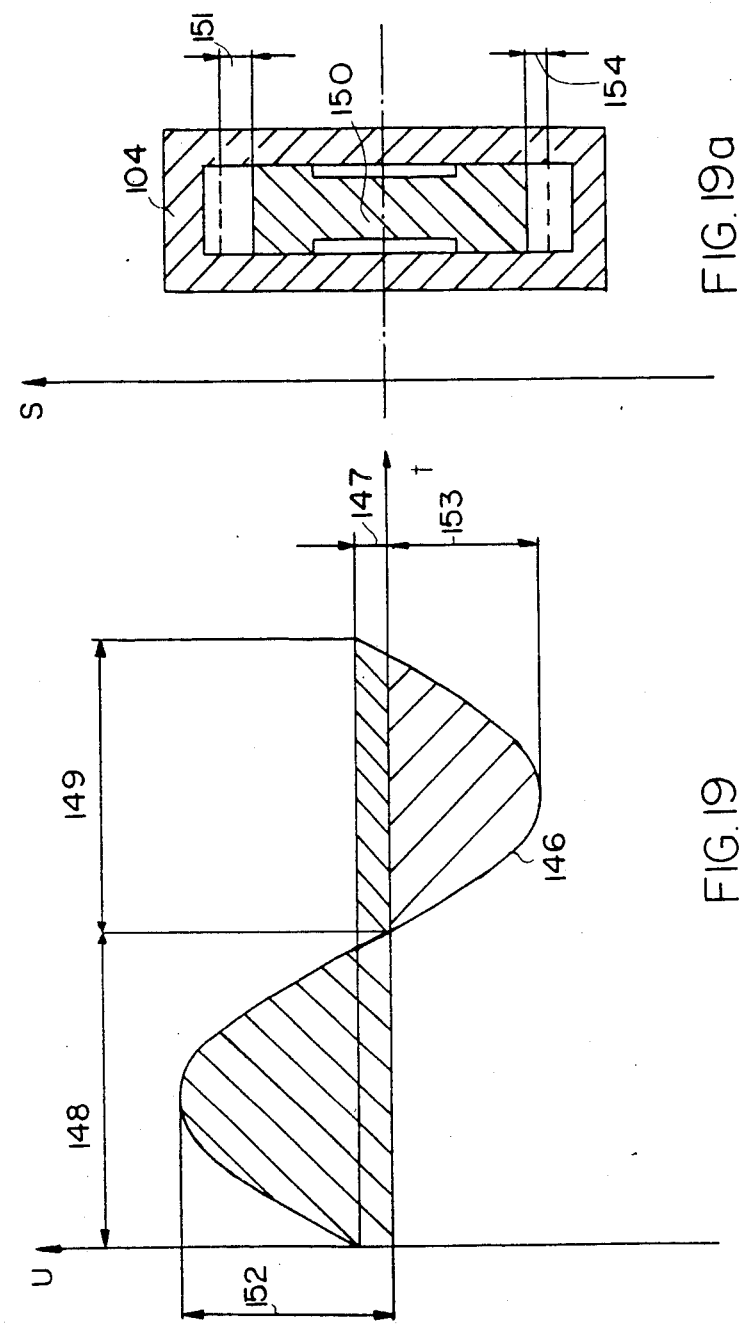
FIG. 19 is a graph of a control signal produced in the circuit of FIG. 18 for controlling the flow control valve of FIG. 16.

FIG. 18 is a block diagram of an electronic control for the valves such as 104 in FIG. 16, for controlling the oscillation. This electronic control circuit can replace the switching drum 38. A frequency generator or oscillator 134 supplies an oscillating signal which may be amplified and modulated as desired in a modulator 135. The oscillator 134 has a control input connected to receive a control signal derived from the gear drive transmission 48 for controlling the frequency generated by the oscillator 134. Since the valve 104 of FIG. 16, which is a proportional valve to be actuated by the frequency generator 134, has two separate magnets, each magnet must alternatingly be actuated. For this purpose, the oscillating signal is divided into a positive (upper) half wave 136 and a negative (lower) half wave 137. These positive and negative half waves 136, 137 alternatingly actuate the two magnets 138 and 139 of the valve 104, and thereby the valve is constantly switched back and forth. Since the valve is a so-called proportional valve, the excursions of the magnets are proportional to the voltage applied. In this manner, the lathe chisel may oscillate back and forth along a given contour. However, it is necessary for machining a profile, that a certain guide or lead feed advance is provided. In the switching drum control this guide or lead feed advance is achieved by means of cams of various lengths, which cause the hydraulic valve, which is not a proportional valve, to maintain the switching position "feed advance forward" longer than the other switching position, (feed advance reverse). In order to achieve this effect in the electronic control for the valve, a constant d.c. voltage 140 may be superimposed on the electronic signal, so that the amplitude of one half wave becomes larger and the amplitude of the other half wave becomes smaller as shown in FIG. 19. The proportional valve 104 reacts to this offset signal, and correspondingly opens various cross-sectional areas, to achieve a varying oil throughflow.

The d.c. voltage portion and the oscillating signal may be adjusted by means of the potentiometers 141 and 142 respectively to achieve the necessary ratio so that the amplitude of the oscillation motion in the direction of the lead or guide feed advance direction, the carrier feed advance, is given by:

$$A = s\,(1 + 1/z)$$

and the amplitude in the opposite direction, pulling away from the cut, is given by:

$$A = s\,(1 - 1/z).$$

A summing circuit 143 with a summing potentiometer 145 combines the signal of the positive and negative half waves as desired, without altering the magnitude ratio of the two signals to each other. The summing circuit 143 is connected to an output amplifier 144 supplying a control signal to the operating magnets or solenoids 138, 139 of the valve 104, e.g.

By means of this arrangement, practically any desired feed advance magnitudes may be achieved. This arrangement may simply be adjusted for other rotational speeds of the work piece by means of adjusting a summing circuit with the summing potentiometer 145 or the frequency of the oscillator 134 may be controlled through the r.p.m. of the gear drive 48.

FIG. 19 shows one wave length of the signal supplied by the electronic circuit arrangement of FIG. 18. A constant d.c. voltage 147 is superimposed on a sinusoidal signal 146. The length 148 represents the positive half wave, and the length 149 represents the negative half wave. After the d.c. voltage is superimposed on the oscillating signal, these two half waves 148 and 149 are separately supplied to a respective magnet or solenoid 138, 139 of the valve 104.

FIG. 19a shows the piston 150 of the valve 104 (FIG. 16). The amplitude 152 of the positive half wave 148 corresponds to the maximum excursion 151 of the piston 150 in one direction. The maximum excursion 154 in the other direction is proportional to the amplitude 153 of the negative half wave 149. As may be seen, the magnitude of the amplitude 152 is the magnitude of the amplitude of the initial sinusoidal wave form 146 plus the d.c. value 147, whereas the magnitude of the amplitude 153 is the initial amplitude magnitude of the sinusoidal wave 146 minus the d.c. value 147, (see FIG. 19).

In the following, an example of a CNC-machine is described. A CN-control must take into account a plurality of parameters which have an influence on the machining:
  null point shifting
  reference point
  tool correction with regard to wear and tear
  tool correction with regard to geometry of the tool
  cutting radius
  reversal play or lag in the feed advance drive spindle.

Figure 20:
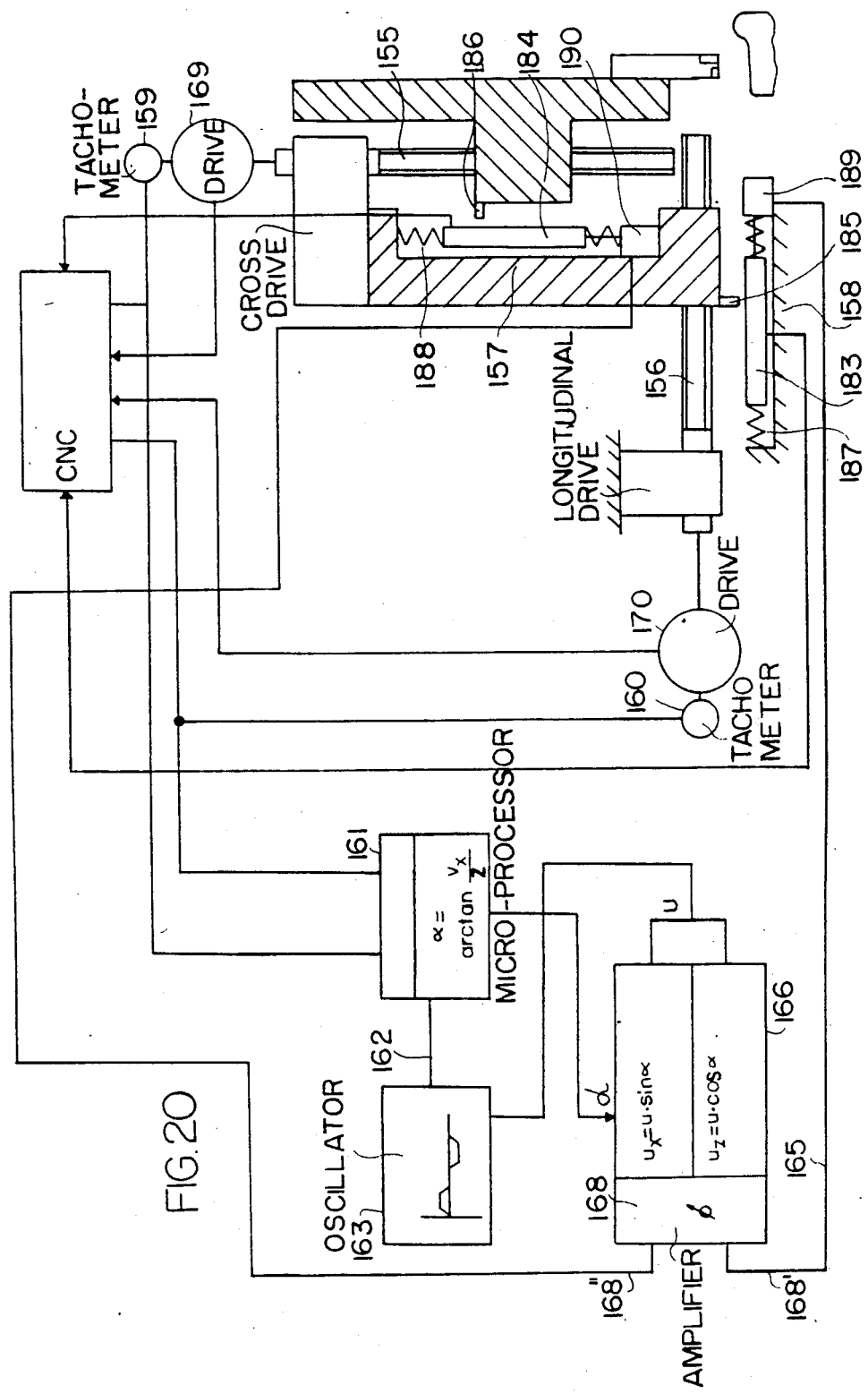
FIG. 20 shows a block diagram and partial section view of a CNC-circuit for producing an oscillatory tool movement.

The calculation of the oscillating position along the profile, calculated by the CN-control, is thus time consuming and also is of varying time length, dependent upon the respective position along the profile. The time required for calculating the oscilations can easily become too large. The entire control circuit may become unstable in boundary or limit situations. Programming an oscillation in a pointwise manner would considerably increase the expense and memory storage capacity requirement for the contour description or definition. In order to avoid such difficulties, a direct, external influence is applied to the CN-control. FIG. 20 shows one possibility of externally influencing the CN-control, as an example. The CNC-axes 156 and 155 are equipped with a linear path distance measuring system 158 and 157, respectively. Each of the distance measuring systems 158, 157 comprises a measuring rule 183, 184 and a slider 185, 186 which is in cooperative contact with the respectively arranged measuring rule 183, 184. The measuring rules 183, 184 are provided with a scale for indicating the distance information. The scales may be of various technically different types. The sliders 185 and 186 serve to sense or scan the scales of the measuring rules.

A certain or specified position of a support carriage corresponds to a certain position of the slider on the measuring rule, which in normal cases is spacially rigidly arranged. However, if this measuring rule is slidably arranged, the reference position or orientation of the measuring system may be changed as desired. If the measuring rule is shifted, the slider takes a new position along the measuring rule, and a new relative actual position of the support carriage is reported to the CN-control. This new actual position is seen as a position error by the CN-control, which then tries to correct this apparent error. The correcting action continues until the slider has reattained its initial position on the measuring rule, as prior to the shifting movement. The support carriage, thus, has travelled through a path distance corresponding to the shifting of the measuring rule.

In FIG. 20, the measuring rules 183, 184 are displaced by means of magnetic coils or solenoids 189, 190, respectively. These magnetic solenoids 189, 190 are actuated with a periodically alternating voltage, so that the measuring system of the CN-control reports a periodically alternating position error. Since the CN-control corrects or compensates for these position errors, the support carriages follow the shifting movements of the measuring system until the position errors are corrected. If the measuring rules are continually shifted back and forth, the carriages similarly move back and forth periodically. If the magnetic solenoids 189, 190 are deenergized, the measuring rules 183, 184 are centered into a middle position by means of springs 187, 188.

The profile slope angle must be given for the oscillation along a profile. This information is given by the rotation speed or rather the voltages provided by the tachometers 159, 160 of the feed advance drives 169, 170. These tachometer voltages are directly proportional to the velocity of the support carriages. If the support carriages travel with a continuous feed advance without oscillation along a profile, the magnitude of the profile slope angle may be calculated from the ratio of the tachometer voltages, for example by means of a microprocessor 161. The corresponding tachometer voltages will oscillate according to the oscillations of the two support carriages. It is possible to determine the profile slope angle even from oscillating tachometer voltages.

If the oscillating signal passes through its null point when the measuring rule travels through a middle position, which is normall a spring-centered middle position, and remains for a short time at that position, the support follows the programmed contour at the programmed feed advance velocity. At this moment the tachometer voltages do not oscillate and may be tapped for computing the profile slope angle. The microprocessor 161 is connected by a conductor 162 to the frequency generator or oscillator 163. At each null position of the oscillating signal, the frequency generator 163 provides a command for determining the profile slope angle to the microprocessor 161 through the conductor 162. The signal supplied by the frquency oscillator 163 is separated for both axes x and z in the signal processing circuit 166.

The oscillation amplitudes in the direction of the x-axis and the z-axis are changed corresponding to the slope angle α of the profile and as determined by the microprocessor 161. To achieve this, the microprocessor 161 delivers an electrical signal corresponding to the slope angle α to the signal processing circuit 166. The voltages $U_x$ and $U_z$ are to have the ratio $$\frac{U_x}{U_z} = \frac{\sin \alpha}{\cos \alpha}$$

wherein α is the slope angle of the profile to be machined. Both voltages $U_x$ and $U_z$ may be amplified or attenuated by means of an amplifier 168, without changing their ratio with respect to each other. Thus, the amplitude of the oscillation may be adjusted. The CN-control offers the possibility of influencing the setting of the amplifier 168 by means of the machining program. The oscillatory motion may be varied or switched corresponding to program commands, in order to prevent shape errors at contour locations having small radii of curvature. The amplifier 168 has a first output 168' connected to control the solenoid 189 for displacing the rule 183. The amplifier 168 has a second output 168" connected to the solenoid 190 for displacing the rule 184 as described above.

Figure 21:
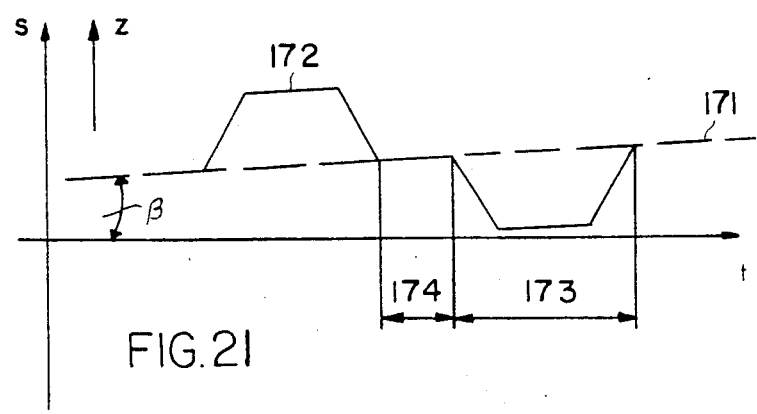
FIG. 21 is a motion diagram of the oscillating tool movement.

FIG. 21 graphically shows the described oscillation process. Here the feed advance movement S in the z-direction is shown as a function of time, whereby the profile angle β shown in FIG. 4a forms a parameter.

Figure 22:
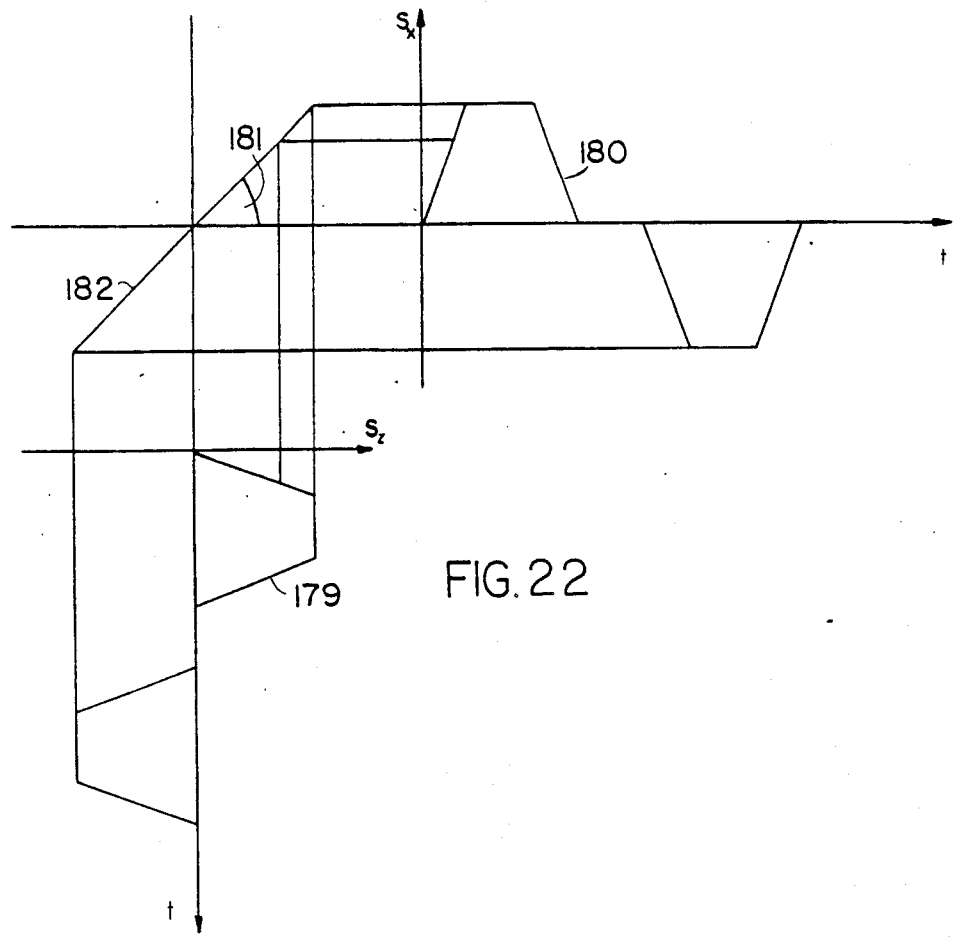
FIG. 22 is a motion diagram of the motion components in the x and z directions of a rectangular coordinate system.

The dotted line 171 corresponds to the program path of the tool in the z-direction corresponding to a basic feed advance. The oscillatory motion 172 is superimposed over this basic feed advance 171 through the effect of the path distance measuring system described above. Within a period of time 174 the frequency oscillator 163 of FIG. 20 interrupts the oscillating process. During this period 174 the tachometer voltages must be tapped by the microprocessor 161 under the CN-control. The graph of the feed advance motion in the x-direction shown in FIG. 22 is qualitatively the same, so that at the same time the tachometer voltages are determined for the x-axis. In the time span 174 the slope angle α of the profile to be turned must also be calculated, so that this slope angle α may be taken into account in the time span 173, which is followed by a time span 174.

In FIG. 22, the curve 179 represents the oscillatory motion of the tool caused by the longitudinal drive 170 in the $S_z$ direction. The curve 180 represents the oscillating motion of the tool caused by the cross drive 169 in the $S_x$ direction. An angle 181 between a line 182 and the time coordinate t is 45° indicating that the amplitudes of both oscillating motions are equal to each other. However, these amplitudes do not need to be equal, one may be smaller or larger than the other.

Although the invention has been described with reference to specific example embodiments, it will be appreciated, that it is intended to cover all modifications and equivalents within the scope of the appended claims.

What we claim is:

1. A method for breaking the chips formed when turning a rotating work piece on a machine tool, comprising the following steps:
   (a) causing an effective tool feed advance FA of a tool for each work piece revolution,
   (b) oscillating said tool relative to a feed advance line generated by feed advance vectors forming a work piece contour,
   (c) controlling said tool oscillating so that the respective oscillation has an amplitude A corresponding to about one half of said effective tool feed advance FA ($A \approx 0.5 \times FA$), and
   (d) further controlling said oscillating so that said oscillation has a wave length L satisfying the condition that said wave length L times a given whole number (n) plus one half of said wave length is equal to an instantaneous work piece circumference, $(L \times n) + 0.5L = C$ at a point being presently machined on said work piece.

2. The method of claim 1, wherein said wave length $L + 0.5L$ is equal to said instantaneous work piece circumference C, ($C = L + 0.5L$).

* * * * *